(12) United States Patent
Yamada et al.

(10) Patent No.: US 8,176,273 B2
(45) Date of Patent: May 8, 2012

(54) BACKING-UP APPARATUS, BACKING-UP METHOD, AND BACKING-UP PROGRAM

(75) Inventors: Hidenori Yamada, Kawasaki (JP); Hirotomo Tokoro, Kawasaki (JP); Koji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 796 days.

(21) Appl. No.: 12/230,390

(22) Filed: Aug. 28, 2008

(65) Prior Publication Data

US 2009/0157990 A1    Jun. 18, 2009

(30) Foreign Application Priority Data

Dec. 14, 2007 (JP) ................................. 2007-324030

(51) Int. Cl.
   *G06F 12/00* (2006.01)
(52) U.S. Cl. ........................................................ 711/162
(58) Field of Classification Search .................. 711/162, 711/161, 170, E12.002, E12.103
   See application file for complete search history.

(56) References Cited

U.S. PATENT DOCUMENTS

| 5,720,026 | A | 2/1998 | Uemura et al. |
| 7,272,693 | B2 | 9/2007 | Ushijima et al. |
| 7,356,658 | B2 | 4/2008 | Satoyama et al. |

FOREIGN PATENT DOCUMENTS

| JP | 9-101912 | 4/1997 |
| JP | 2005-292865 | 10/2005 |
| JP | 2006-107162 | 4/2006 |

*Primary Examiner* — Midys Rojas
(74) *Attorney, Agent, or Firm* — Staas & Halsey LLP

(57) ABSTRACT

A backing-up apparatus, upon receiving an instruction to execute backing up, allocates a storage area to store a snapshot to be produced to each time point indicated by the instruction. When the original data is updated after the time point indicated by the instruction, it is checked that the original data corresponding to the place to which the updating has been executed at a time point immediately before the time point indicated by the instruction is stored in the storage area allocated as the storage area to store the latest snapshot produced for the immediately previous time point. When it has been confirmed that the original data is not stored, the original data immediately before the updating corresponding to the place to which the updating has been executed is stored in only the storage area to store the latest snapshot.

10 Claims, 23 Drawing Sheets

| GENERATION | COLLECTION TIME |
|---|---|
| 1 | 1:00 |
| 2 | 2:00 |
| 3 | 3:00 |
| 4 | 4:00 |
| 5 | 5:00 |
| 6 | 6:00 |
| 7 | 7:00 |
| ⋮ | ⋮ |

FIG.8

| | USED AMOUNT | STARTING PHYSICAL ADDRESS | CURRENTLY USED LBA |
|---|---|---|---|
| FIRST GENERATION SDV | 5G | 200 | 200, 210, ⋯ |
| SECOND GENERATION SDV | 5G | | |
| THIRD GENERATION SDV | 5G | | |
| FOURTH GENERATION SDV | 5G | | |
| FIFTH GENERATION SDV | 5G | | |
| ⋮ | ⋮ | ⋮ | ⋮ |

FIG.12

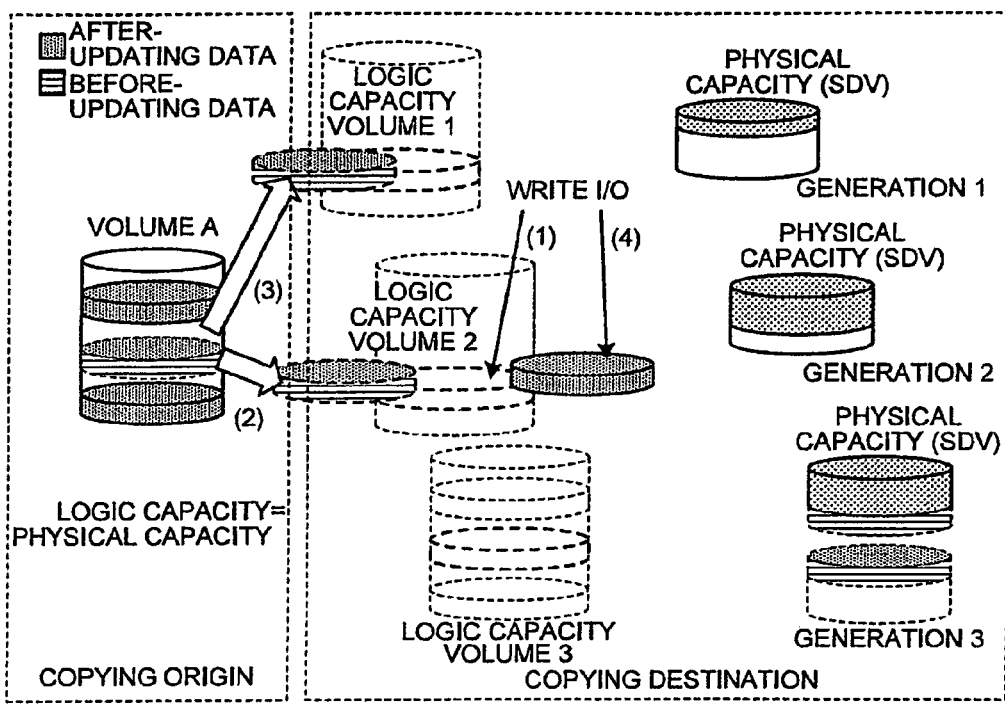

FIG.13

| | IMMEDIATELY PREVIOUS GENERATION [A] | WRITE REQUEST GENERATION [B] | LATEST GENERATIONS [C] | TRANSFER PATTERN |
|---|---|---|---|---|
| 1 | TRANSFERRED | TRANSFERRED | <DON'T CARE> | NO TRANSFER |
| 2 | NOT YET TRANSFERRED | TRANSFERRED | <DON'T CARE> | [B]→[A] |
| 3 | NOT YET TRANSFERRED | NOT YET TRANSFERRED | TRANSFERRED | [C]→[B] + [C]→[B] |
| 4 | NOT YET TRANSFERRED | NOT YET TRANSFERRED | NOT YET TRANSFERRED | [S]→[B] + [S]→[A] |
| 5 | TRANSFERRED | NOT YET TRANSFERRED | TRANSFERRED | [C]→[B] |
| 6 | TRANSFERRED | NOT YET TRANSFERRED | NOT YET TRANSFERRED | [S]→[B] |

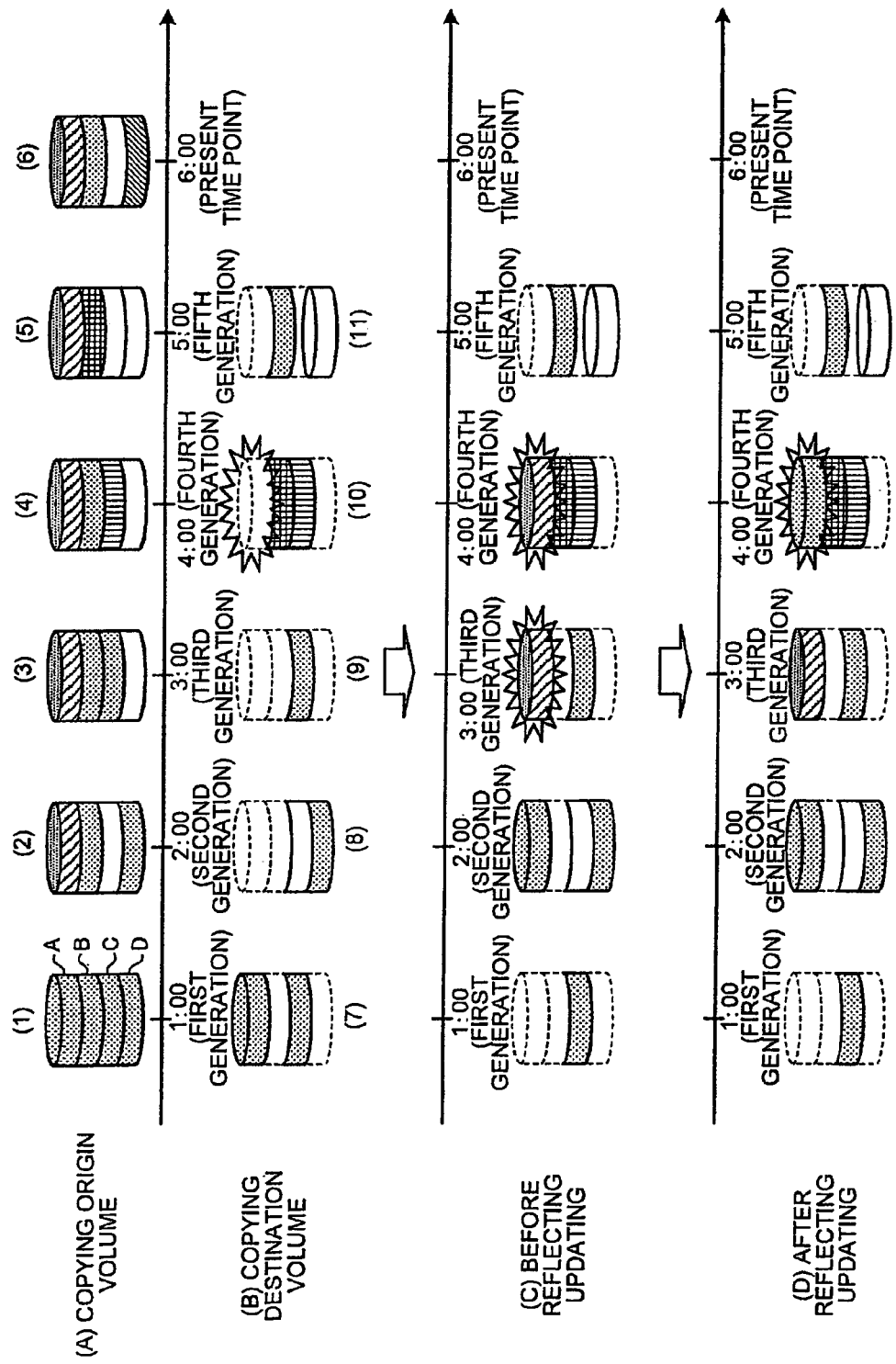

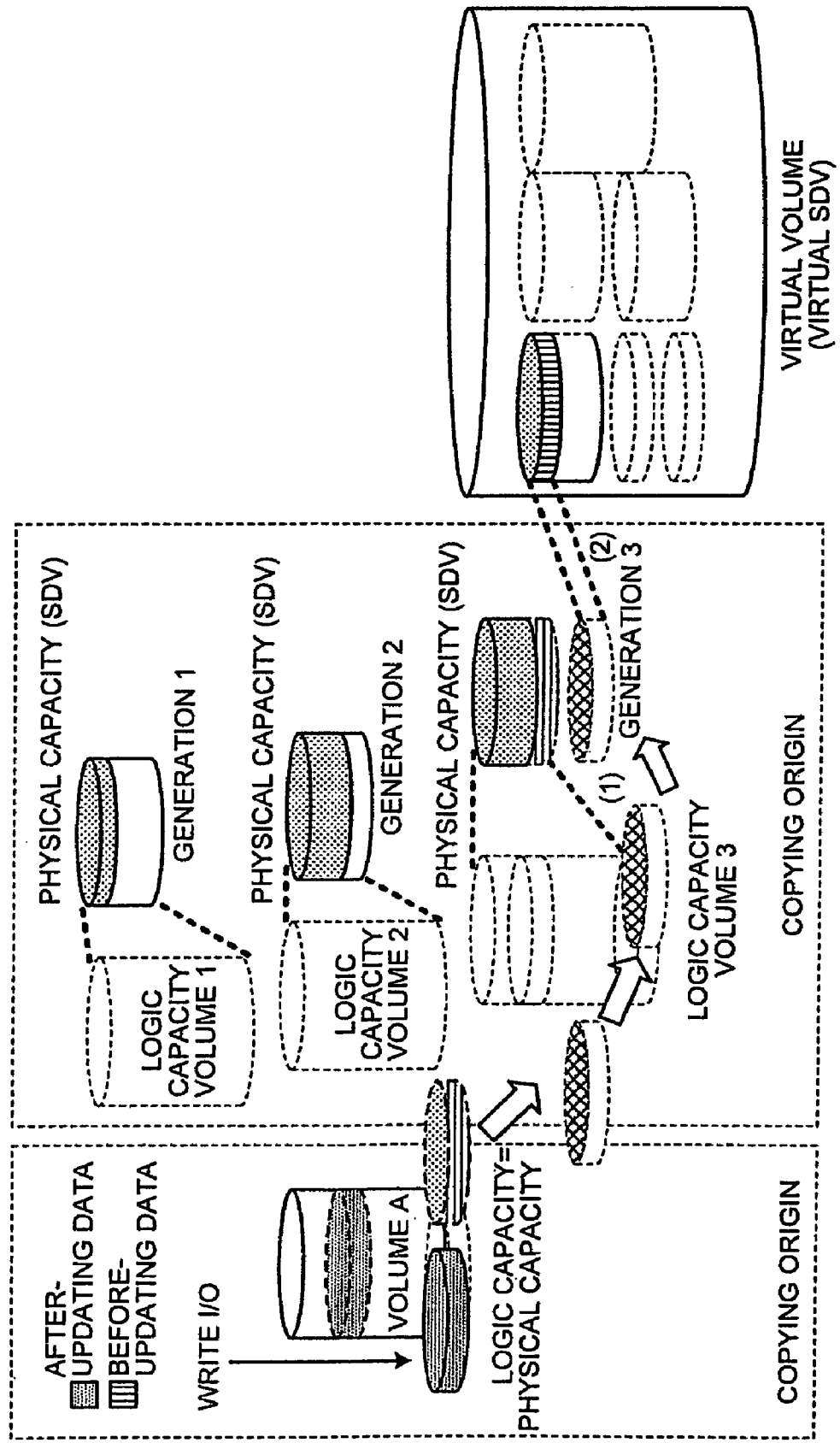

|  | USED AMOUNT | STARTING PHYSICAL ADDRESS | CURRENT USED LBA |
|---|---|---|---|
| FIRST GENERATION SDV | 5G | 200 | 200, 210, ... |
| SECOND GENERATION SDV | 5G |  |  |
| THIRD GENERATION SDV | 5G |  |  |
| FOURTH GENERATION SDV | 5G |  |  |
| FIFTH GENERATION SDV | 5G |  |  |
| ⋮ | ⋮ | ⋮ | ⋮ |

(2)

| VIRTUAL VOLUME IDENTIFYING NUMBER | USED AMOUNT | STARTING PHYSICAL ADDRESS | CURRENT USED LBA |
|---|---|---|---|
| 1 | 3G | 100 | 100, 110, ... |
| 2 | 6G | 500 |  |
| 3 | 2G | 300 |  |
| 4 | 1G | 200 |  |
| ⋮ | ⋮ | ⋮ | ⋮ |

(3)

|  | VIRTUAL VOLUME IDENTIFYING NUMBER |
|---|---|
| FIRST GENERATION SDV | 1, 2 |
| SECOND GENERATION SDV | 3, 4 |
| ⋮ | ⋮ |

(4)

FIRST GENERATION SDV
CURRENT USED LBA

FIG.22

| GENERATION | BACKING-UP ELAPSED TIME [h] | USAGE RATE [%] | UPDATED AMOUNT [MB] | UPDATED RATE [MB/h] |
|---|---|---|---|---|
| 1 | ELAPSED TIME 1 | USAGE RATE 1 | UPDATED AMOUNT 1 | UPDATED RATE 1 |
| 2 | ELAPSED TIME 2 | USAGE RATE 2 | UPDATED AMOUNT 2 | UPDATED RATE 2 |
| 3 | ELAPSED TIME 3 | USAGE RATE 3 | UPDATED AMOUNT 3 | UPDATED RATE 3 |
| 4 | ELAPSED TIME 4 | USAGE RATE 4 | UPDATED AMOUNT 4 | UPDATED RATE 4 |

FIG.23

| VIRTUAL VOLUME IDENTIFYING NUMBER | USED DISK | USED AMOUNT [MB] |
|---|---|---|
| 1 | DISK 1, DISK 2, DISK 3 | USED AMOUNT 1 |
| 2 | DISK 5, DISK 6 | USED AMOUNT 2 |
| 3 | DISK 5, DISK 6 | USED AMOUNT 3 |
| 4 | DISK 7, DISK 8, DISK 9 | USED AMOUNT 4 |
| 5 | DISK 1, DISK 2, DISK 3 | USED AMOUNT 5 |

BACKING-UP APPARATUS, BACKING-UP METHOD, AND BACKING-UP PROGRAM

BACKGROUND OF THE INVENTION

1. Field of the Invention

The present invention relates to a backing-up apparatus, a backing-up method, and a backing-up program.

2. Description of the Related Art

Conventionally, OPC (One Point Copy) is known as one of the approaches of backing up a copying origin volume in a storage device or a computer. OPC produces a snapshot that is data at a predetermined time point (not incorporating updates thereafter, etc.) for the data to be backed up and. More specifically, when a backup is produced, OPC is an approach of backing up the whole data of a copying origin volume that is the target at the time of the production.

For example, when a backing-up apparatus that executes OPC receives an OPC instruction to execute OPC from a user, the apparatus duplicates or copies the whole data of a copying origin volume that is present at the time when the OPC instruction has been received. The backing-up apparatus stores the duplicated data (backup data) as the snapshot at the time when the OPC has been received. Describing taking a specific example, the backing-up apparatus stores the backup data that is the data obtained by duplicating the whole copying origin volume in accordance with the time point at which the apparatus has received the OPC instruction and the generation information (session information).

An approach called "SnapOPC" is known as one of expanded functions for the above-mentioned OPC. SnapOPC is an approach of backing up only the data before updating in the place to which the updating has been executed in the data of the copying origin volume when a backup is produced.

For example, when a backing-up apparatus that executes SnapOPC receives a SnapOPC instruction to execute SnapOPC, the backing-up apparatus allocates a predetermined storage area correlating the area with the time point at which the apparatus has received the SnapOPC instruction and the generation information (session information). When updating is executed to the copying origin volume after the SnapOPC instruction has been received, only the data before the updating in the place to which the updating has been executed (the differential data that has been lost from the copying origin volume due to the execution of the updating) is duplicated and is stored in the storage area. Japanese Patent Application Laid-Open Publication No. 2005-292865 discloses one of the approaches of storing differential data.

The above conventional technique has a problem that a data transfer amount can not be reduced as described below.

For example, in the above conventional OPC, as to the copying origin volume at the time when the OPC instruction has been received, the whole data of the copying origin volume is copied for each time point at which such an instruction has been received. Therefore, the backing-up apparatus that executes the OPC copies and transfers the whole data of the copying origin volume for each time point at which an OPC instruction is issued. Therefore, the data amount to be transferred is tremendous.

For example, in the above conventional SnapOPC, as shown in FIG. 27, in the case where a plurality of SnapOPC instructions are issued, when first updating is executed in a place in the original data, the data before the updating in the place is transferred to and stored in each storage area allocated in each session executed before the updating. Therefore, the data amount to be transferred is tremendous. FIG. 27 is an explanatory view of the conventional SnapOPC.

Description will be given for the case, as a specific example, where, in the conventional backing-up apparatus that executes SnapOPC, a SnapOPC instruction is issued for three times by a user and, thereafter, first updating is executed in a place in the original data. To store a backup at the time when each SnapOPC instructions is issued, the conventional backing-up apparatus that executes SnapOPC transfers and stores each data before each updating in the place to/in each of the storage areas (each of a total of three storage areas) allocated being correlated with the session information for each of the three SnapOPC instructions. The approach of the above publication (Japanese Patent Application Laid-Open Publication No. 2005-292865) does not reduce the data amount to be transferred.

SUMMARY

It is an object of the present invention to at least partially solve the problems in the conventional technology.

According to an aspect of the present invention, a backing-up apparatus that produces, for each time point at which backing up is executed, a snapshot representing original data at the time point at which the backing up is executed for the original data to be backed up, includes an allocating unit that, upon receiving an instruction to execute the backing up, allocates a storage area to store a snapshot produced at a time point designated by the instruction with respect to each time point designated by the instruction; a checking unit that, when original data is updated after the time point designated by the instruction, checks whether the original data corresponding to a place for which the updating has been executed at a time point immediately before the time point designated by the instruction is stored in the storage area allocated by the allocating unit as a storage area to store the latest snapshot produced for the immediately previous time point; and a storing unit that, when the checking unit confirms that the original data is not stored, stores the original data immediately before the updating corresponding to the place for which the updating has been executed in only the storage area to store the latest snapshot.

According to another aspect of the present invention, a backing-up method that produces, for each time point at which backing up is executed, a snapshot representing original data at the time point at which the backing up is executed for the original data to be backed up, includes allocating, upon receiving an instruction to execute the backing up, a storage area to store a snapshot produced at a time point designated by the instruction with respect to each time point designated by the instruction; checking, when original data is updated after the time point designated by the instruction, whether the original data corresponding to a place for which the updating has been executed at a time point immediately before the time point designated by the instruction is stored in the storage area allocated as a storage area to store the latest snapshot produced for the immediately previous time point; and storing, upon confirming that the original data is not stored, the original data immediately before the updating corresponding to the place for which the updating has been executed in only the storage area to store the latest snapshot.

According to still another aspect of the present invention, a computer program product stores therein a computer program that implements the above method on a computer.

The above and other objects, features, advantages and technical and industrial significance of this invention will be better understood by reading the following detailed descrip-

BRIEF DESCRIPTION OF THE DRAWINGS

Figure 6:
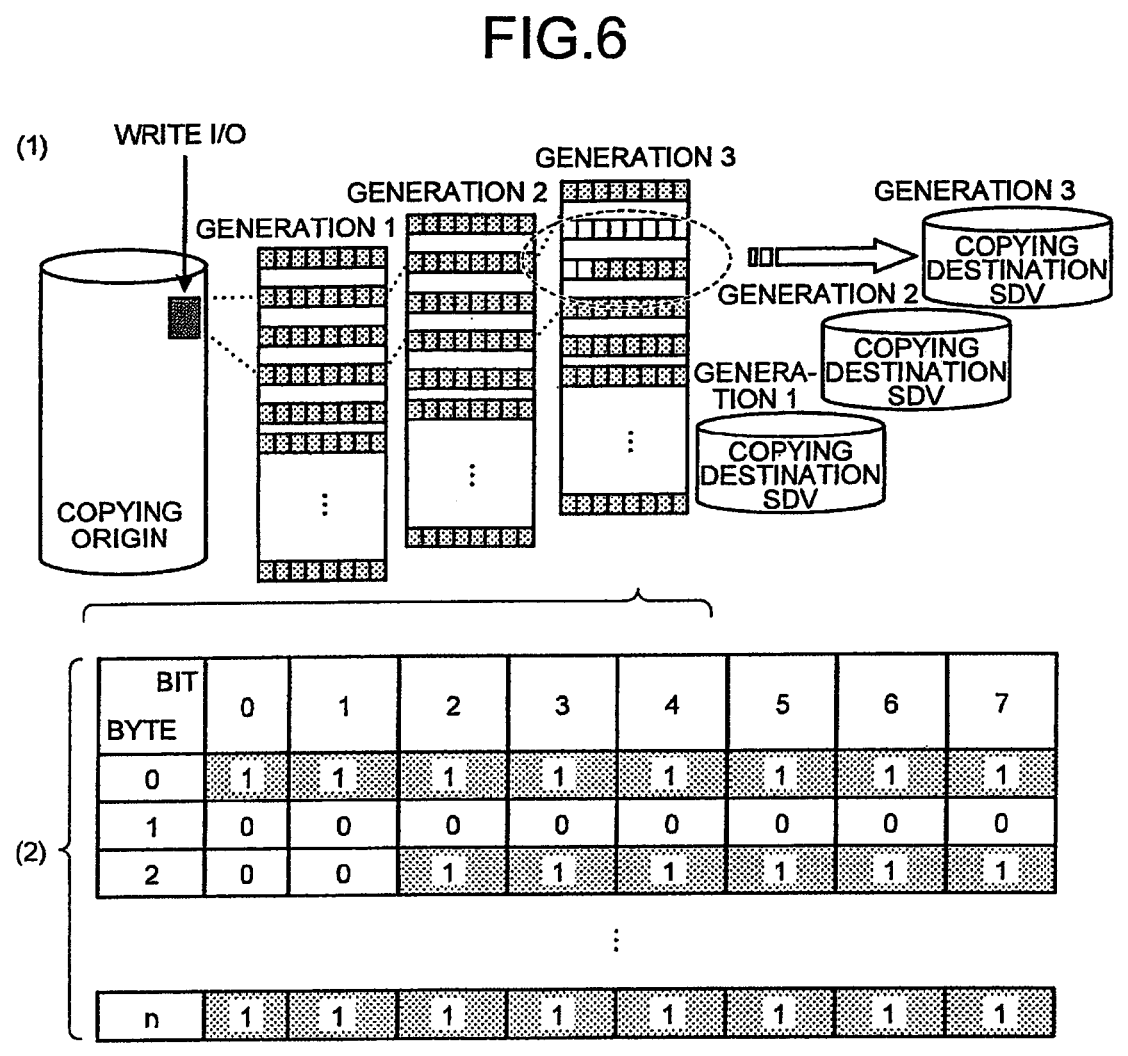

FIG. 6 is an explanatory view of a bit map table in the first embodiment;

FIG. 7 is an explanatory view of a generation management table in the first embodiment;

FIG. 8 is an explanatory view of an SDV management table in the first embodiment;

FIG. 12 is an explanatory view of a pre-change storing unit in the first embodiment;

FIG. 13 is an explanatory view of an example of storage patterns by the pre-change storing unit in the first embodiment;

FIG. 14 is an explanatory view of an example of the storage patterns by the pre-change storing unit in the first embodiment;

FIG. 20 is an explanatory view of the advantages of the backing-up apparatus according to the second embodiment;

FIG. 21 is an explanatory view of an SDV management table in the second embodiment;

FIG. 22 is an explanatory view of a resolution determination table in the second embodiment;

FIG. 23 is an explanatory view of a load distribution table in the second embodiment;

DETAILED DESCRIPTION OF THE PREFERRED EMBODIMENTS

Referring to the accompanying drawings, description will be given in detail for exemplary embodiments of a backing-up apparatus, a backing-up method, and a backing-up program according to the present invention. In the following description, the description will be sequentially given for the premise technology of the backing-up apparatus according to a first embodiment, main terms used in the first embodiment, the overview and features of the backing-up apparatus according to the first embodiment, the configuration of the backing-up apparatus, and the flow of processing, and description will finally be given for other embodiments other than the first embodiment.

Figure 1:
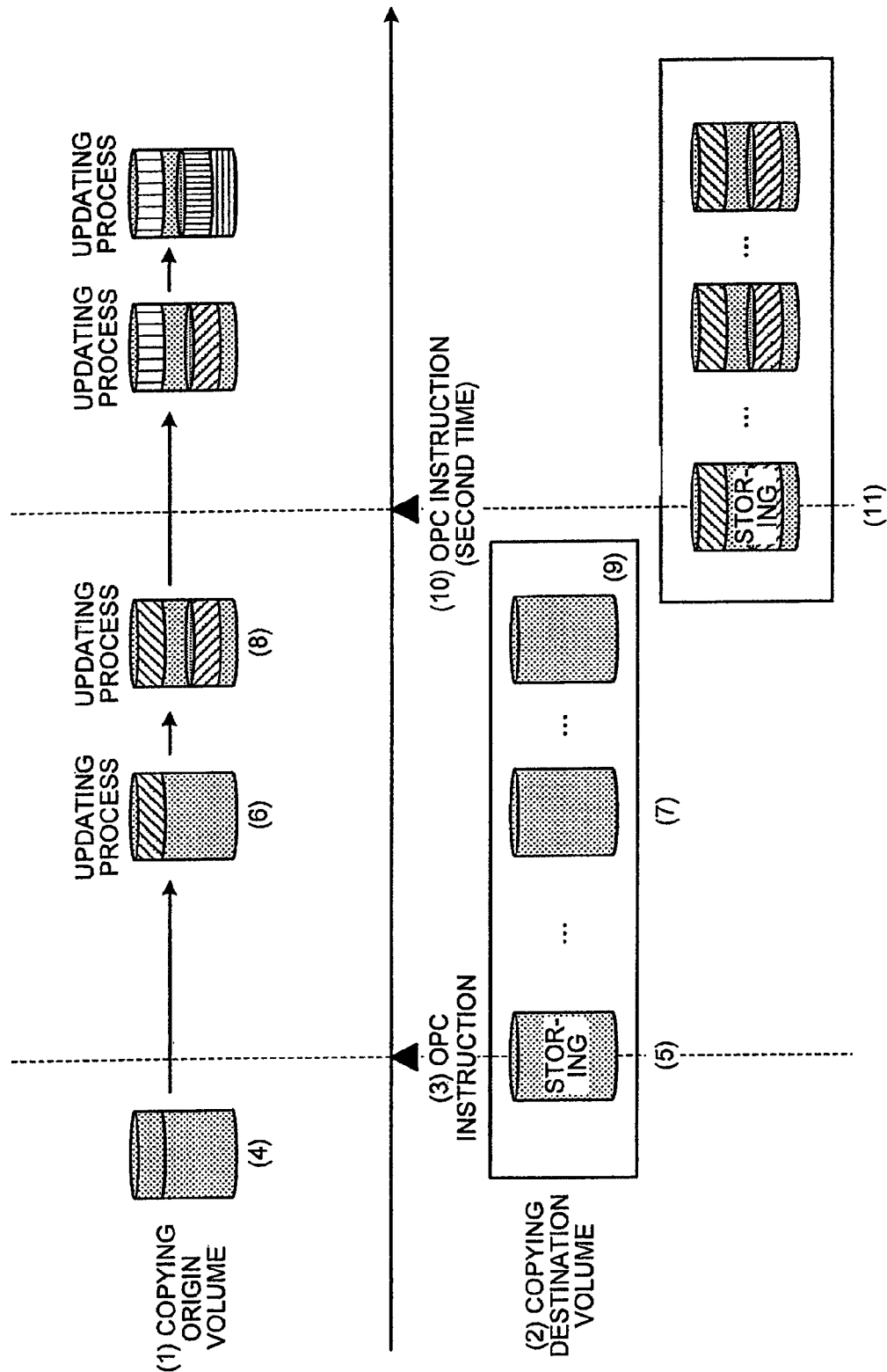
FIG. 1 is an explanatory view of the premise technology.
Figure 2:
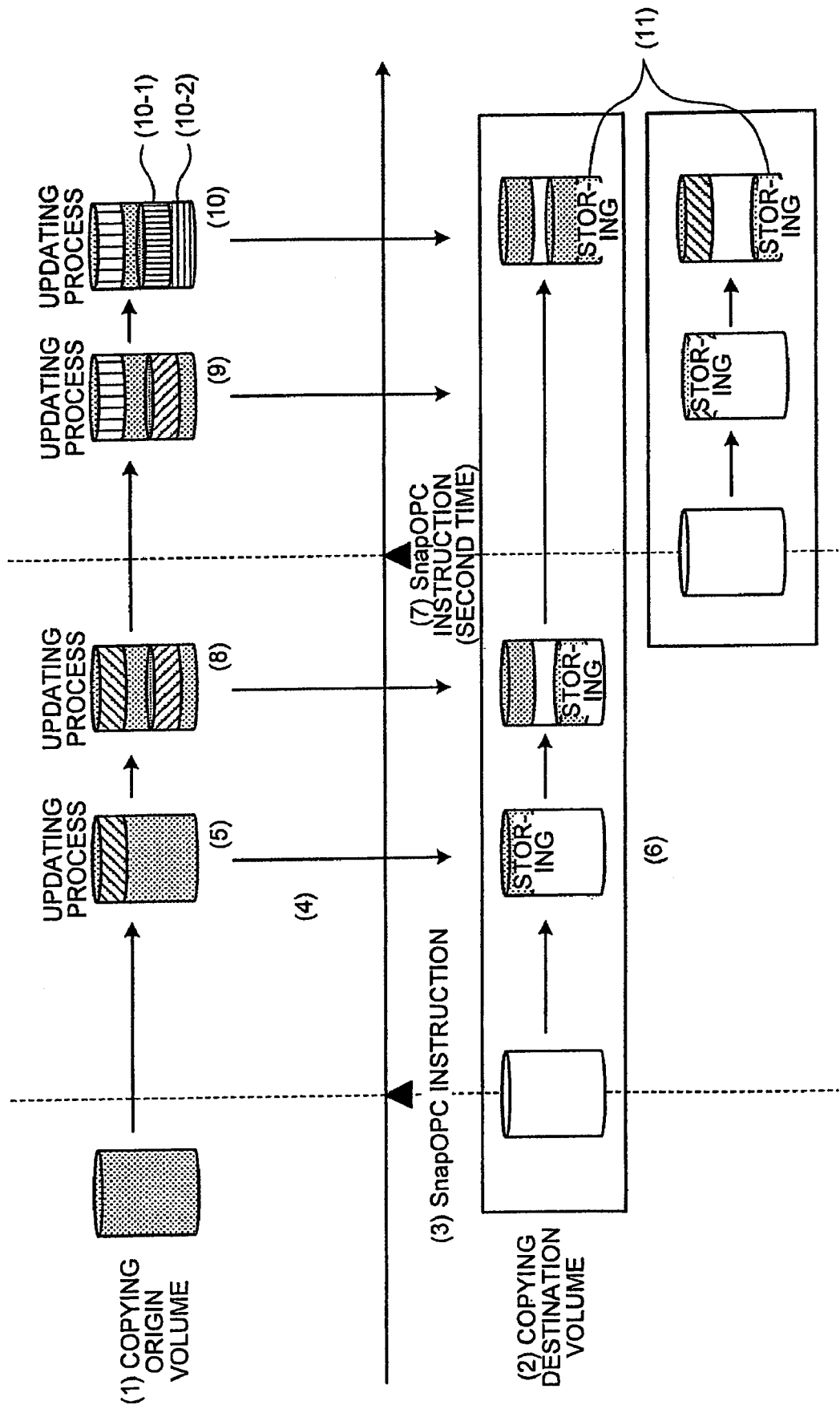
FIG. 2 is an explanatory view of the premise technology.

Referring to FIGS. 1 and 2, description will be first given for the premise technology of the backing-up apparatus according to the first embodiment. More specifically, description will be first given for OPC (One Point Copy) technique that is a premise and, thereafter, description will be given for the conventional SnapOPC technique that is also a premise. FIGS. 1 and 2 are explanatory views of the premise technology.

OPC is one of the approaches of backing up a copying origin volume in a storage apparatus or a computer, and OPC produces a snapshot that is data at a predetermined time point (not incorporating updates thereafter, etc.) for the data (original data) in the copying origin volume to be backed up. More specifically, when a backup is produced, OPC backs up the whole data of the copying origin volume at the time point of the production.

Referring to FIG. 1, description will be given for the operation of OPC. As to data constituting a copying origin volume, reference numeral (1) of FIG. 1 conceptually shows the position and the contents of the data and, more specifically, patterns show the contents of the data. For example, when the patterns are different from each other in a same place, this shows that updating of data has been executed in the place. Reference numeral (2) of FIG. 1 shows a copying destination volume that is backed-up data.

In this case, when the backing-up apparatus that executes OPC receives an OPC instruction to execute OPC from a user, the backing-up apparatus duplicates or copies the whole data of the copying origin volume at the time point at which the OPC instruction has been received, to the copying destination volume. For example, as shown by reference numeral (3) of FIG. 1, when the backing-up apparatus has received the OPC instruction, the backing-up apparatus duplicates only the data at the time point at which the OPC instruction has been received as shown by reference numeral (5) of FIG. 1 as to the copying origin volume shown by reference numeral (4) of FIG. 1 that is the copying origin volume at the time point at which the OPC instruction has been received. That is, this backing-up apparatus duplicates the whole data of the copying origin volume shown by reference numeral (4) of FIG. 1 as shown by reference numeral (7) of FIG. 1 without reflecting the contents of updating executed thereafter as shown by reference numeral (6) of FIG. 1. In this case, the data of the copying origin volume shown by reference numeral (4) of FIG. 1 and the data of the copying destination volume shown by reference numeral (7) of FIG. 1 are same.

Even when any updating process is executed to the copying origin volume thereafter as shown by reference numeral (8) of FIG. 1, the backing-up apparatus that executes OPC fixes and holds the contents of the copying origin volume regardless of the contents and the presence or absence of the updating process as shown by reference numeral (9) of FIG. 1 (without reflecting any update operations).

When the backing-up apparatus that executes OPC receives an OPC instruction again as shown by reference numeral (10) of FIG. 1, the backing-up apparatus executes the same process as that of the above reference numeral (5) of FIG. 1 and, thereby, duplicates the whole data of the copying origin volume shown by reference numeral (8) of FIG. 1 and produces a copying destination volume shown by reference numeral (11) of FIG. 1. In this case, the data of the copying origin volume shown by reference numeral (8) of FIG. 1 and the data of the copying destination volume shown by reference numeral (11) of FIG. 1 are same.

At this time, the backing-up apparatus that executes OPC produces a copying destination volume shown by reference numeral (13) of FIG. 1 produced according to the "OPC instruction" shown by reference numeral (11) of FIG. 1 in addition to the copying destination volume shown by reference numeral (7) of FIG. 1 produced according to the "OPC instruction" shown by reference numeral (3) of FIG. 1. Therefore, every time the backing-up apparatus receives an OPC instruction, the backing-up apparatus produces a copying destination volume for the OPC instruction and stores the copying destination volume that has duplicated therein the whole data of the copying origin volume correlating the volume with the time point at which the OPC instruction has been received and the generation information (session information).

Conventional SnapOPC is one of expanded functions for the above-mentioned OPC. SnapOPC is an approach of backing up only the data before updating at the place to which the updating has been executed in the data of the copying origin volume when backing up is executed. In description about the conventional SnapOPC, the description that is same as the description about OPC will be omitted or simplified.

Referring to FIG. 2, description will be given for the operation of the conventional SnapOPC. Reference numeral (1) of FIG. 2 shows the state of the data constituting a copying origin volume and reference numeral (2) of FIG. 2 shows backed up data.

In this case, when the backing-up apparatus that executes the conventional SnapOPC receives a SnapOPC instruction to execute SnapOPC from a user as shown by reference numeral (3) of FIG. 1, the apparatus only correlates the time point at which the SnapOPC instruction has been received and the generation information (session information) with a storage area to store a snapshot at the time point at which the SnapOPC instruction has been received and, at this time point, stores no data in the storage area.

As shown by reference numeral (4) of FIG. 2, as to updating executed after the SnapOPC instruction has been received, the backing-up apparatus duplicates only the data before the updating in the place to which the updating has been executed and stores the duplicated data into the copying destination volume. Describing this taking a specific example, when the updating has been executed to the copying origin volume as shown by reference numeral (5) of FIG. 2 after the SnapOPC instruction has been executed, the backing-up apparatus duplicates only the data before the updating in the place to which the updating has been executed as shown by reference numeral (6) of FIG. 2, and stores the duplicated data into a predetermined storage area that is correlated with session information corresponding to the SnapOPC instruction shown by reference numeral (3) of FIG. 2 as a copying destination volume.

Description will further be given for the operation of the backing-up apparatus that executes the conventional SnapOPC. Every time this backing-up apparatus receives a SnapOPC instruction, the backing-up apparatus creates correlation between the session information and a storage area to store a snapshot at the time point at which the SnapOPC instruction has been received. When updating is executed after the SnapOPC instruction has been received, the backing-up apparatus stores the data before the updating in the place to which the updating has been executed in each of one or more storage areas.

Description will be given taking an example of, for example, the case where the first SnapOPC instruction is executed as shown by reference numeral (3) of FIG. 2, a second SnapOPC instruction is executed by reference numeral (7) of FIG. 2, and updating processes shown by reference numerals (5), (8), (9), and (10) of FIG. 2 are executed. The backing-up apparatus that executes the conventional SnapOPC stores the data before the updating processes shown by reference numerals (5) and (8) of FIG. 2 have been executed for the places that have been updated by these updating processes as above in a predetermined storage area that is correlated with the session information that corresponds to the SnapOPC instruction shown by reference numeral (3) of FIG. 2.

Description will be given for updating processes shown by reference numerals (9) and (10) of FIG. 2. The backing-up apparatus that executes the conventional SnapOPC does not store the data before the updating process shown by reference numeral (9) of FIG. 2 for the place that has been updated by this updating process that is the updating process executed after the SnapOPC instruction shown by reference numeral (3) of FIG. 2 in a predetermined storage area that is correlated with the session information corresponding to this instruction. Because, though the updating process is executed after the SnapOPC instruction shown by reference numeral (3) of FIG. 2, the updated place shown by reference numeral (9) of FIG. 2 is same as the updated place shown by reference numeral (5) of FIG. 2 and the data corresponding to the place in the data of the copying origin volume at the time point at which the SnapOPC instruction shown by reference numeral (3) of FIG. 2 has been received has already been stored in the predetermined storage area that is correlated with the session information corresponding to the SnapOPC instruction executed by reference numeral (3) of FIG. 2.

The backing-up apparatus that executes the conventional SnapOPC stores, in a predetermined storage area that is correlated with the session information corresponding to the SnapOPC instruction executed by reference numeral (3) of FIG. 2, only the data before the updating for an updated place shown by reference numeral (10-2) of FIG. 2 of the data before the updating for the place updated by an updating process shown by reference numeral (10) of FIG. 2 that is the updating executed after the instruction. This is because the updated place shown by reference numeral (10-1) of FIG. 2 is same as the updated place shown by reference numeral (8) of FIG. 2 and the data corresponding to the place in the data of the copying origin volume at the time when the SnapOPC instruction shown by reference numeral (3) of FIG. 2 has been received is already stored in a predetermined storage area correlated with the session information corresponding to the SnapOPC instruction executed by reference numeral (3) of FIG. 2. On the other hand, the data before the updating for the updated place shown by reference numeral (10-2) of FIG. 2 is not yet stored in the predetermined storage area.

Similarly, the backing-up apparatus that executes the conventional SnapOPC stores the data before the updating for the position updated by the updating processes shown by reference numerals (9) and (10) of FIG. 2 that are the updating processes executed after the instruction in a predetermined storage area that is correlated with the session information corresponding to a SnapOPC instruction executed by reference numeral (7) of FIG. 2.

That is, in the case where a plurality of SnapOPC instructions have been issued and, thereafter, updating processes have been executed, the backing-up apparatus that executes the conventional SnapOPC stores, for the same number of times as that of execution of the SnapOPC instruction, the data before the updating for the place updated by the updating processes in each predetermined storage area that are correlated with the session information corresponding to the plurality of SnapOPC instruction when the data before the updating in the place to which the updating process has been executed has not been stored in the predetermined storage area (for example, when the first updating process is executed).

For example, for the updating process executed to the updated place shown by reference numeral (10-2) of FIG. 2, the backing-up apparatus stores the data before the updating in the place in both of the predetermined storage area that is correlated with the session information corresponding to the SnapOPC instruction executed by reference numeral (3) of FIG. 2 and the predetermined storage area that is correlated with the session information corresponding to the SnapOPC instruction executed by reference numeral (7) of FIG. 2, as shown by reference numeral (11) of FIG. 2.

Description will be given for main terms used in the first embodiment. Backing up used in the first embodiment refers to the execution of SnapOPC described in the above description regarding the premise technology and, more specifically, this term refers to backing up only the data before the updating in the place to which the updating has been executed in the data of the copying origin volume when a backup is produced.

Figure 3:
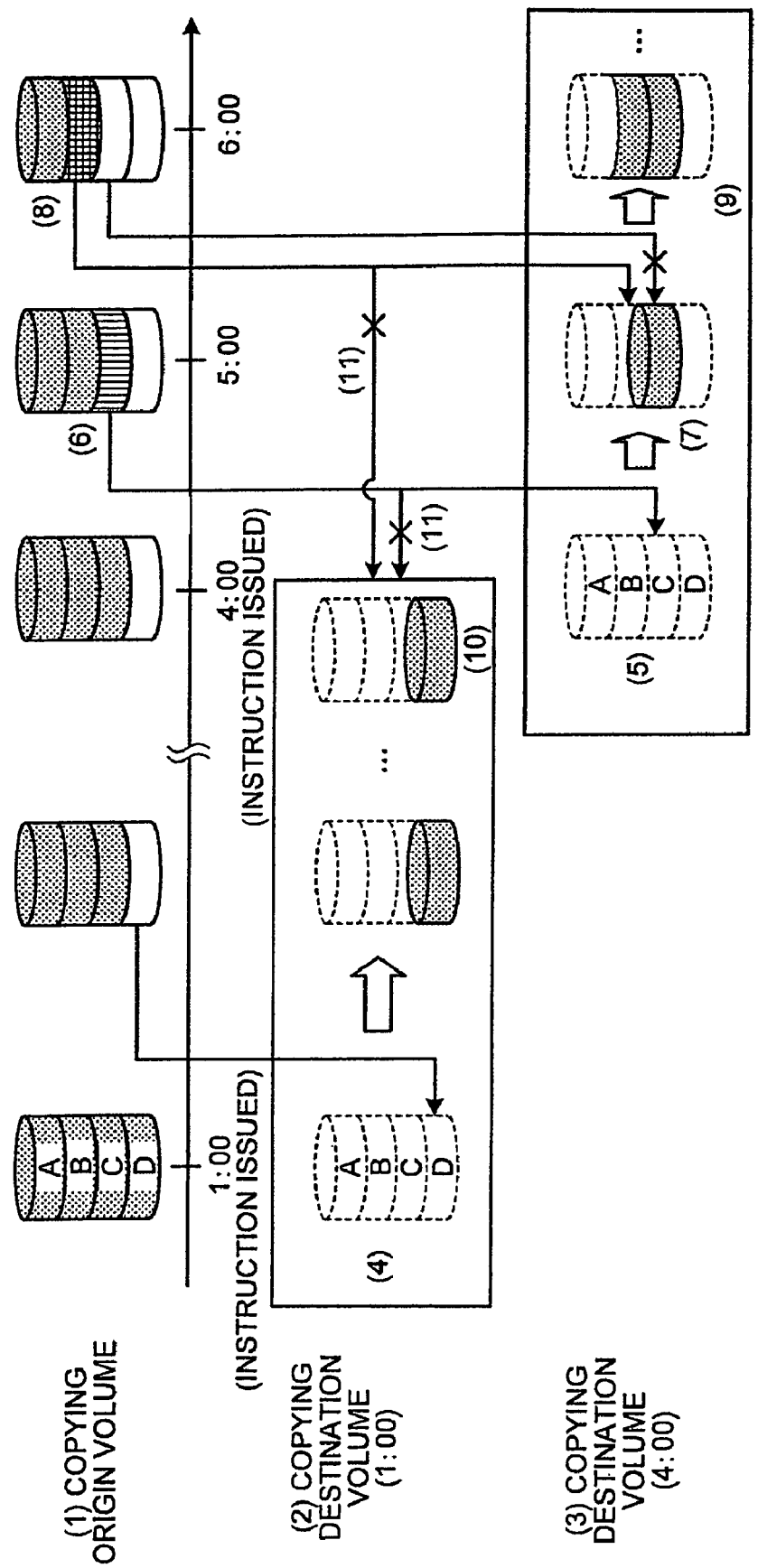
FIG. 3 is an explanatory view of the overview and the advantages of a backing-up apparatus according to a first embodiment of the present invention.

Referring to FIG. 3, description will be given for the overview and features of the backing-up apparatus according to the first embodiment. FIG. 3 is an explanatory view of the overview and the features of the backing-up apparatus according to the first embodiment.

For the data constituting a copying origin volume (that corresponds to original data of the present invention), reference numeral (1) of FIG. 3 conceptually shows information that uniquely identifies the data from other data constituting the copying origin volume and the contents of the data and, more specifically, a place (position) in the copying origin volume indicates the information to be identified and the pattern indicate the contents of the data. Therefore, for example, when patterns are different from each other at a same position, this shows that updating of data has been executed at the position. Reference numerals (2) and (3) of FIG. 3 represent copying destination volumes that each are backed-up data.

For convenience, description will be given assuming that four places are present in the copying origin volume and also in the copying destination volume. Description will be given assuming that, for example, four places of "A", "B", "C", and "D" are present in the copying origin volume.

The overview is that, as shown in FIG. 3, as to the copying origin volume to be backed up, the backing-up apparatus according to the first embodiment produces a snapshot that shows the copying origin volume at a time point at which backing up is executed, for each time point at which the backing up is executed. For example, when backing up is executed at "1:00" and "4:00", the backing-up apparatus produces a snapshot for each of "1:00" and "4:00". As described below, when the backing-up apparatus produces a snapshot, the backing-up apparatus can reduce the transfer amount of data to be stored from the copying origin volume to a storage area (the transfer amount of data to be stored as a copying destination volume).

In this case, when the backing-up apparatus according to the first embodiment has received an instruction to execute backing up, the backing-up apparatus allocates a storage area to store the snapshot to be produced at a time point designated by the instruction. For example, when the backing-up apparatus has received an instruction to execute backing up at "1:00" and "4:00", the backing-up apparatus allocates a predetermined storage area to each of the snapshots to be produced respectively at "1:00" and "4:00" as shown by reference numerals (4) and (5) of FIG. 3.

For reference numerals (4) and (5) of FIG. 3, the size of a predetermined storage capacity to be allocated and the size of the copying origin volume are described as being the same size for convenience in showing the places to position updated data in the copying origin volume. However, the present invention is not limited to this and, as described in the above description regarding the premise technology, the backing-up apparatus that executes SnapOPC generally allocates a capacity that is smaller than the size of the copying origin volume as the predetermined storage capacity to store only the data before the updating in the place to which the updating process has been executed.

When the copying origin volume has been updated after the time point designated by the instruction to execute the backing up, the backing-up apparatus according to the first embodiment checks whether the copying origin volume that corresponds to the place to which the updating has been executed at a time point immediately before the time point designated by the instruction is stored in the storage area allocated as the storage area to store therein the latest snapshot produced for the time point immediately before the time point of the instruction.

Description will be given for, for example, the case where an updating process is executed in "C" of the copying origin volume at "6:00" as shown by the copying origin volumes respectively at "4:00" and "5:00" of FIG. 3. In the time points to execute backing up, the time point at which backing up has been executed immediately before "5:00" at which the backing up is executed is "4:00". In this case, as shown by reference numeral (6) of FIG. 3, the backing-up apparatus according to the first embodiment confirms that data in "C" of the copying origin volume at "4:00" is not stored in the predetermined storage area to store a snapshot to be produced for the time point of "4:00" (the storage area shown by reference numeral (5) of FIG. 3).

When it has been confirmed that no such data is stored, the backing-up apparatus according to the first embodiment stores the copying origin volume immediately before the updating corresponding to the place to which the updating has been executed in only the storage area to store the latest snapshot. For example, as shown by reference numeral (7) of FIG. 3, the backing-up apparatus stores the copying origin volume immediately before the updating in "C" of the copying origin volume in only the predetermined storage area to store the snapshot produced for the time point of "4:00" (the storage area shown by reference numeral (5) of FIG. 3) that is a storage area to store the latest snapshot.

Description will be given for the case where, on the other hand, for example, the updating process is again executed in "B" and "C" of the copying origin volume at "5:00" as shown in the copying origin volume at each of "5:00" and "6:00" of FIG. 3. As shown by reference numeral (8) of FIG. 3, the backing-up apparatus according to the first embodiment already stores the copying origin volume immediately before the updating in "C" of the copying origin volume in the predetermined storage area to store the snapshot to be produced at the time point of "4:00" (the storage area shown by reference numeral (3) of FIG. 3). Therefore, the backing-up apparatus confirms that the backing-up apparatus stores the data in "C" of the copying origin volume at "4:00" and also confirms that the backing-up apparatus has not stored the data in "B" of the copying origin volume at "4:00". As shown by reference numeral (9) of FIG. 3, the backing-up apparatus then stores only the data in "B" of the copying origin volume at "4:00" that the backing-up apparatus has confirmed as being not stored in only the predetermined storage area to store the snapshot to be produced for the time point of "4:00" (a storage area shown by reference numeral (5) of FIG. 3).

In this case, description will be further given for a storing process by the backing-up apparatus according to the first embodiment. In the following description, the description will be given assuming that, as shown by reference numeral (10) of FIG. 3, the backing-up apparatus according to the first embodiment stores only the data in "D" of the copying origin volume in a predetermined storage area to store the snapshot produced for the time point of "1:00".

In this case, as described in the above description regarding premise technology, the backing-up apparatus that executes the conventional SnapOPC stores the copying origin volume immediately before the updating corresponding to the place to which the updating has been executed in each of storage areas that does not store the copying origin volume immediately before the updating corresponding to the place. Describing this taking an example of, for example, an updating process executed at "5:00" of FIG. 3, the apparatus stores the copying origin volume immediately before the updating in "C" of the copying origin volume in not only the predetermined storage area to store the snapshot to be produced for the time point of "4:00" (the storage area shown by reference numeral (5) of FIG. 3) but also a predetermined storage area to store the snapshot to be produced for the time point of "1:00" (the storage area shown by reference numeral (4) of FIG. 3).

In contrast, as shown by reference numeral (11) of FIG. 3, the backing-up apparatus according to the first embodiment does not store the copying origin volume immediately before the updating in "B" and "C" of the copying origin volume in the predetermined storage area to store the snapshot to be produced at the time point of "1:00" (the storage area shown by reference numeral (4) of FIG. 3) even when the copying origin volume immediately before the updating in "B" or "C" of the copying origin volume is not stored therein.

Based on the above, the backing-up apparatus according to the first embodiment can reduce the transfer amount of the data to be stored from the copying origin volume to a storage area when a snapshot is produced, as the above main feature.

Figure 4:
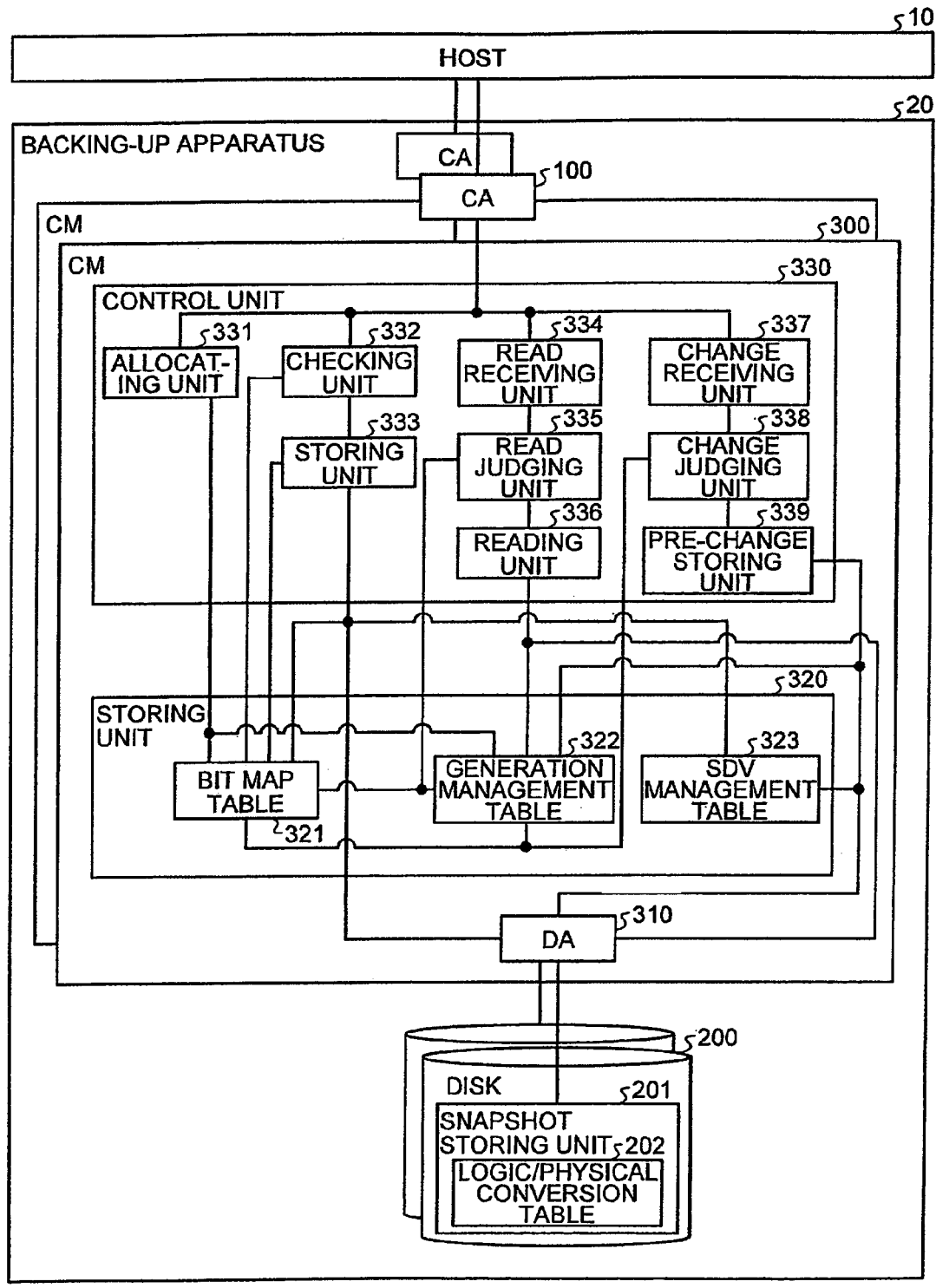
FIG. 4 is an explanatory block diagram of the configuration of the backing-up apparatus according to the first embodiment.
Figure 5:
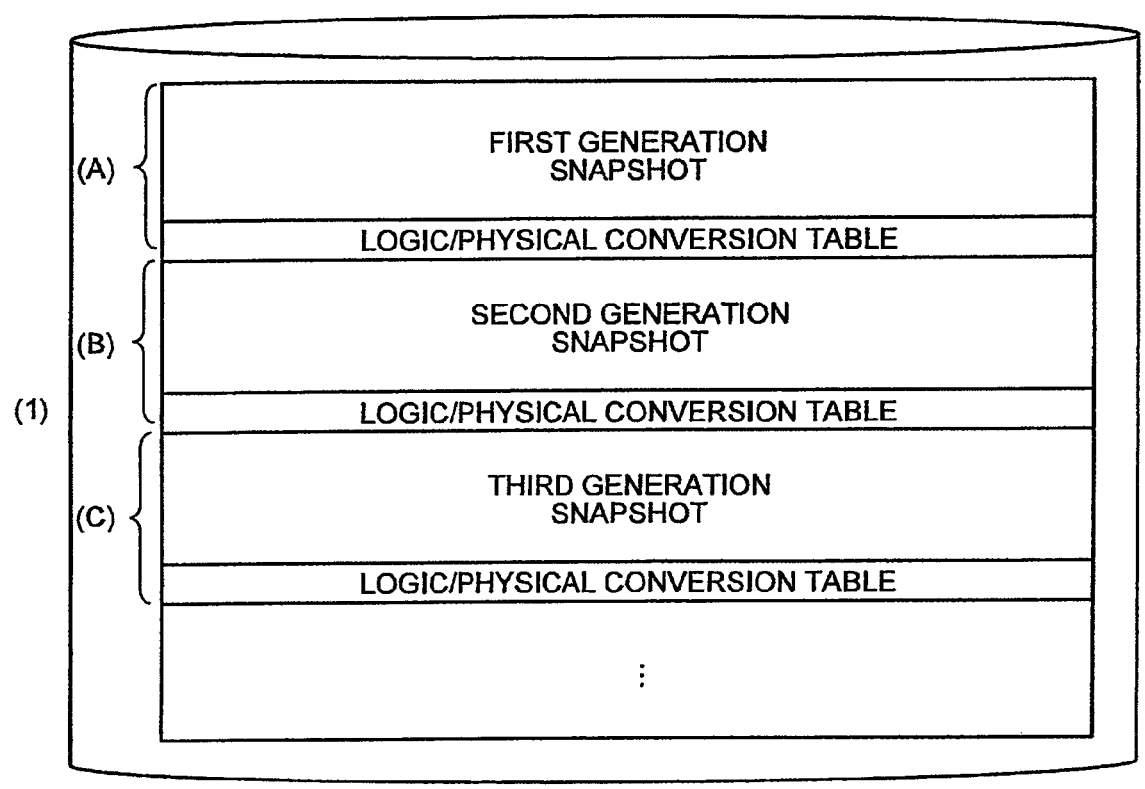
FIG. 5 is an explanatory view of a disc in the first embodiment.
Figure 9:
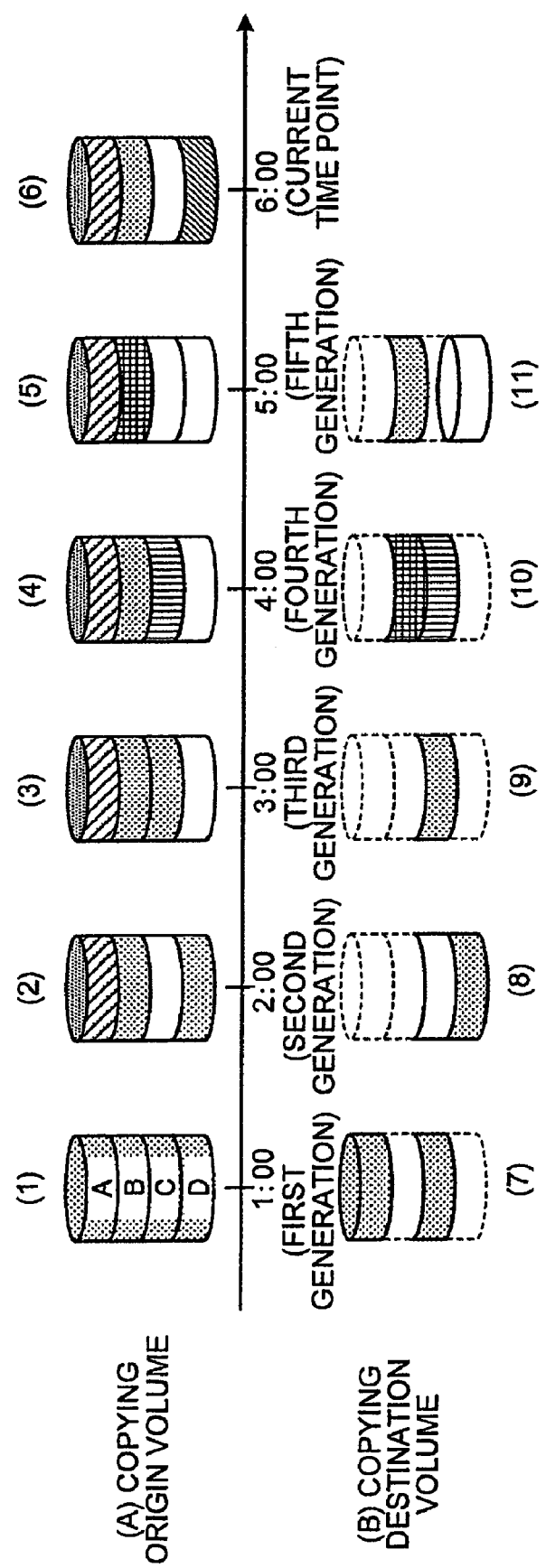
FIG. 9 is an explanatory view of a control unit in the first embodiment.
Figure 10:
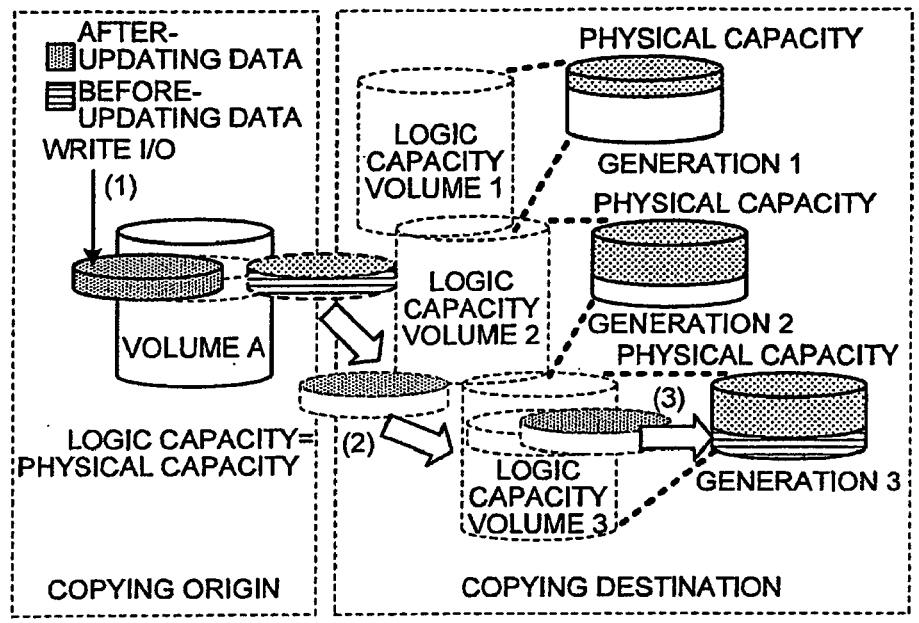
FIG. 10 is an explanatory view of a storing unit in the first embodiment.
Figure 11:
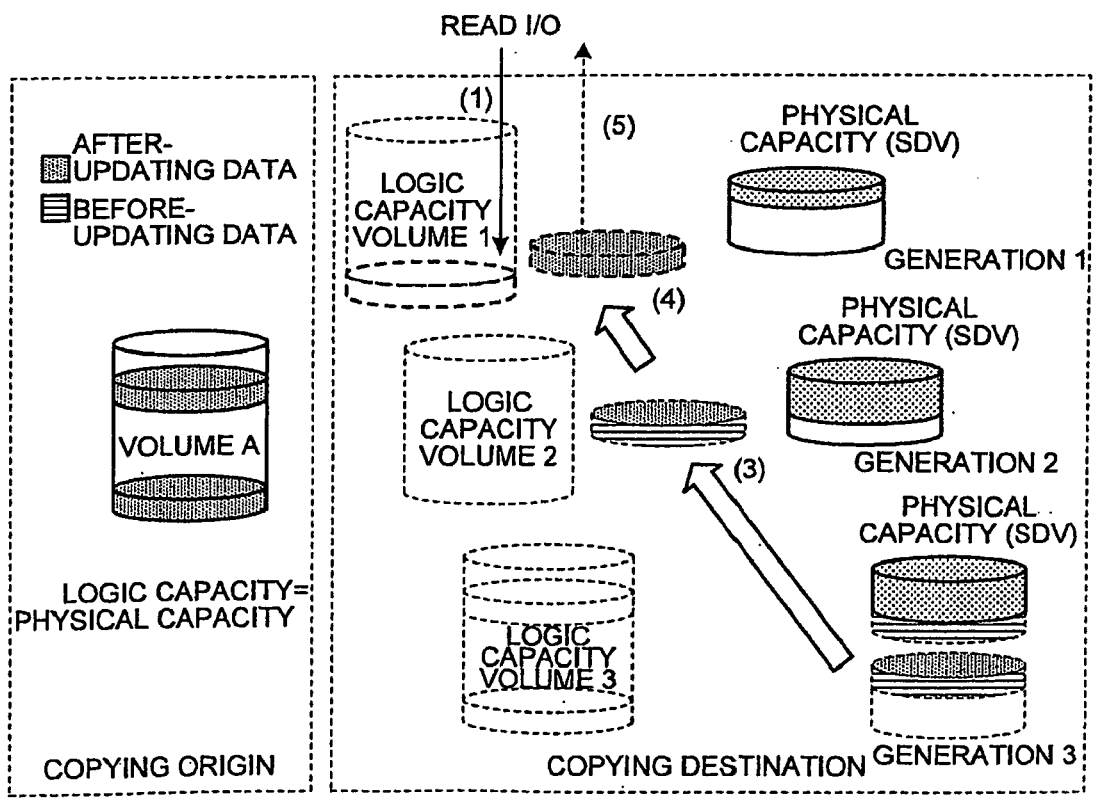
FIG. 11 is an explanatory view of a reading unit in the first embodiment.

Referring to FIGS. 4 to 14, description will be given for the configuration of the backing-up apparatus shown in FIG. 3. FIG. 4 is an explanatory block diagram of the configuration of the backing-up apparatus according to the first embodiment. FIG. 5 is an explanatory view of a disk in the first embodiment. FIG. 6 is an explanatory view of a bit map table in the first embodiment. FIG. 7 is an explanatory chart of a generation management table in the first embodiment. FIG. 8 is an explanatory chart of an SDV management table in the first embodiment. FIG. 9 is an explanatory view of a control unit in the first embodiment. FIG. 10 is an explanatory view of a storing unit in the first embodiment. FIG. 11 is an explanatory view of a reading unit in the first embodiment. FIG. 12 is an explanatory view of a before-updating storing unit in the first embodiment. FIG. 13 is an explanatory chart of an example of storage patterns by the before-updating storing unit in the first embodiment. FIG. 14 is an explanatory view of an example of the storage patterns by the before-updating storing unit in the first embodiment.

As shown in FIG. 4, a backing-up apparatus 20 is configured by a CA (Channel Adaptor) 100, a CM (Centralized Module) 300, and a disc 200. The backing-up apparatus 20 is connected to a Host 10 through the CA 100.

The Host 10 is an apparatus used by an operator and, for example, a computer terminal used by a user who manages the backing-up apparatus 20 corresponds to the Host 10. The Host 10 transmits an instruction to produce a snapshot to the backing-up apparatus 20 through the CA 100 that will be described below.

The CA 100 is an I/F (interface) control unit with the Host 10 and controls transmission and reception of information between the CA 100 and the Host 10. Basically, the CA 100 controls a process of receiving an instruction to produce a snapshot from the Host 10 and also controls a process of transmitting a response to the instruction to the Hose 10.

The disc 200 is a storage medium or storage device that stores data necessary for a baking-up process. The disc 200 especially includes a snapshot storing unit 201 and a logic/physical conversion table 202 in the snapshot storing unit 201 as those that are closely related to the present invention. For example, disc apparatuses such as an HDD (Hard Disc Drive), an optical magnetic disc (a magneto-optical disc, an MO disc) can be used for disc 200. The disc 200 may be a storing apparatus that stores information and is not limited to a storing apparatus having a disc.

The disc 200 stores therein the copying origin volume to be backed up. The present invention is not limited to the case where the disc 200 in the backing-up apparatus 20 stores therein the copying origin volume to be backed up and the backing-up apparatus may be connected to, for example, a storing apparatus that stores therein the copying origin volume through a network.

The snapshot storing unit 201 stores therein a snapshot representing the original data at the time when backing up is executed. More specifically, the snapshot storing unit 201 stores therein data as the snapshot according to an instruction of storing unit 333 described later. The data of the stored snapshot is read by a reading unit 336 described later. The data of the snapshot stored in the snapshot storing unit 201 is varied by a pre-change storing unit 339 described later.

As shown by reference numeral (1) of FIG. 5, for each time point at which backing up is executed, the snapshot storing unit 201 stores therein a snapshot produced for a time point designated by the instruction in each storage area allocated by an allocating unit 331 described later at each time point designated by the instruction.

For example, in an example shown by reference numeral (1) of FIG. 5, in the snapshot storing unit 201, a storage area (A) shown in FIG. 5 is allocated by the allocating unit 331 described later as a storage area to have stored therein a snapshot of a first generation (for example, at a time point of "1:00") and the snapshot storing unit 201 stores the snapshot of the first generation.

As shown by reference numeral (1) of FIG. 5, the snapshot storing unit 201 stores, in each storage area allocated by the allocating unit 331 described later, the logic/physical conversion table 202 concerning the snapshot to be produced for the time point designated by the instruction in the storage area.

For example, in the example shown by reference numeral (1) of FIG. 5, the snapshot storing unit 201 stores the logic/ physical conversion table 202 concerning the snapshot of the first generation after the area that stores therein the data constituting the snapshot of the first generation in the storage area (A) shown in FIG. 5.

The logic/physical conversion table 202 is a table that stores a logic address that identifies a place in the copying origin volume and a physical address that represents the place that stores therein the data at the logic address in the disc 200 correlating each other and for each time point at which a snapshot is produced. More specifically, the storing unit 333 described later stores the correlation between the logic address and the physical address in the logic/physical conversion table 202.

For example, as shown by reference numeral (2) of FIG. 5, for each generation for which a snapshot is produced, the logic/physical conversion table 202 stores a physical address for each place that stores therein the data after executing the updating to the copying origin volume. The logic/physical conversion table 202 shown by reference numeral (2) of FIG. 5 is the logic/physical conversion table 202 that shows each of all the places in the copying origin volume using a combination of a "bit" and a "byte" and, in this case, the logic/physical conversion table 202 will be described to be a table concerning the snapshot of the first generation. For example, in the example shown by reference numeral (2) of FIG. 5, the logic/physical conversion table 202 shows that the data before the updating at a place represented by the bit "0" and the byte "1" in the copying origin volume is stored in a place represented by a physical address "200" in the storage area to store the snapshot of the first generation.

Description will further be given for the logic/physical conversion table 202. The backing-up apparatus 20 stores only the data in the place to which the updating is executed from the copying origin volume as the snapshot. Therefore, a storage capacity allocated at each time point at which a snapshot is produced is smaller than the capacity of the copying origin volume. Therefore, the backing-up apparatus 20 does not store the data stored in the place to which the updating is executed in the place in the storage area allocated reflecting the place in the copying origin data, and stores the correlation between a physical address that has been actually stored and a logic address that represents the place in the copying origin data.

For example, this correlation may employ an approach of correlating an offset position from the head entry of the logic/physical conversion table 202 with the logic address and of holding by the logic/physical conversion table 202 only the physical address.

The CM 300 has a storing unit 320 to store control programs such as an OS (Operating System), a program that provides the process procedure of backing up, etc., and the necessary data. The CM 300 is a processing unit that executes various backing up processes using the above programs and data. The CM 300 especially includes a control unit 330, the storing unit 320, and a DA (Disc Adaptor) 310 as those that are closely related to the present invention.

The backing-up apparatus 20 includes one or more CMs 300 and each of the CMs 300 has one or more discs 200 that the CM 300 is in charge of. Each CM 300 processes a snapshot stored in each disc 200 that the CM 300 is in charge of (the snapshot storing unit 201 stored in each disc 200 that the CM 300 is in charge of).

The DA 310 is an I/F (interface) control unit with a disc and controls transmission and reception of information between the CM 300 and the disc 200. For example, according to an instruction of the storing unit 333 described later, the DA 310 controls a process of storing the data of a snapshot in the disc 200 and, according to an instruction of the reading unit 336 described later, controls a process of reading a snapshot from the disc 200.

The storing unit 320 is a storage medium to store the data necessary for the backing-up processes and, for example, a cache can be used for the storing unit 320. As shown in FIG. 4, the storing unit 320 is especially configured by a bit map table 321, a generation management table 322, and an SDV management table 323 as those that are closely related to the present invention.

The bit map table 321 stores the place (the updated position) in the copying origin volume of the data stored in the snapshot storing unit 201 by the storing unit 333 described later. More specifically, when the data is stored in the snapshot storing unit 201 by the storing unit 333 described later, the updated position is input by the storing unit 333 described later and the bit map table 321 stores the updated position of the copying origin volume by bit control.

For example, as shown by reference numeral (2) of FIG. 6, each of all the places in the copying origin volume is managed using a combination of a "bit" and a "byte", and "0" is stored correlated with a place (the place to which the updating has been executed in the copying origin volume) that stores therein the data and "1" is stored correlated with a place (the place to which the updating has not been executed in the copying origin volume) that stores therein no data. The bit map table 321 stores the bit map table 321 for each time point at which a snapshot is produced.

For example, in the example shown by reference numeral (1) of FIG. 6, the bit map table 321 stores a bit map for each of the "first generation", the "second generation", and the "third generation", that represents a time point at which a snapshot is produced and, as shown in "WriteI/O" by reference numeral (1) of FIG. 6, every time updating has been executed, "1" is changed to "0" by the storing unit 333 described later for a combination of the "bit" and the "byte" representing an updated place to which the updating has been executed.

The generation management table 322 stores information indicating a time point at which a bit map is produced (the session information). For example, as shown in FIG. 7, correlating with "generation" that is the information to identify the time point at which the bit map is produced from other time points, the generation management table 322 stores therein "collection time" that represents the time point. For example, in the example shown in FIG. 7, the generation management table 322 stores therein a collected time "1:00" correlating the time with a generation "1".

Describing further the generation management table 322, when the backing-up apparatus 20 executes the process of storing the data using the storing unit 333 described later or when the backing-up apparatus 20 executes the process of storing the data using the pre-change storing unit 339 described later, the backing-up apparatus 20 needs to uniquely identify the generation of the snapshot, and the generation management table 322 is used to uniquely identify the generation when each of these process is executed. For example, when a snapshot is stored, which generation is the latest generation is checked by checking the "generation" stored in the generation management table 322.

Though the description is given for the case where the generation management table 322 is used in the first embodiment, the practice of the present invention is not limited to this. For example, the backing-up apparatus 20 may uniquely identify each generation and may identify the latest generation by storing "generations" correlating the "generations" respectively with storage areas.

The SDV management table 323 stores therein information that manages a storage area allocated as a storage area to store a snapshot, for each time point at which the snapshot is produced. More specifically, the SDV management table 323 stores, for each time point, a capacity used (or a remaining capacity) for a storage area allocated and information to grasp the place to store data in the storage area when the data is stored in the storage area, as the information that the SDV management table 323 manages.

For example, as shown in FIG. 8, the SDV management table 323 stores, correlating with each generation, a "used amount (resolution)" representing the capacity of an allocated storage area (a used amount used in the disc 200 when the storage area is allocated), a "starting physical address" representing a starting address of the storage area in the disc 200 to which a storage area has been allocated, and a "currently used LBA (Logical Block Address)" representing an address with which the data is stored in the storage area (an address used by storing the data in the addresses in the storage area).

For example, in the example of FIG. 8, a used amount "5G", a starting address "200", and currently used LBAs "200, 210, . . . " are stored being correlated with the "first generation SDV". "SDV (Snap Date Volume)" refers to a storage area allocated by the allocating unit 331 described later.

As shown in FIG. 4, the control unit 330 is especially configured by the allocating unit 331, a checking unit 332, the storing unit 333, a read receiving unit 334, a read judging unit 335, the reading unit 336, a change receiving unit 337, a change judging unit 338, and the pre-change storing unit 339 as those that are closely related to the present invention.

In this case, the allocating unit 331 corresponds to an "allocating unit" of the present invention. The checking unit 332 corresponds to a "checking unit" of the present invention. The storing unit 333 corresponds to a "storing unit" of the present invention. The read receiving unit 334 corresponds to a "read receiving unit" of the present invention. The read judging unit 335 corresponds to a "first read judging unit" and a "second read judging unit" of the present invention. The reading unit 336 corresponds to a "reading unit" of the present invention. The change receiving unit 337 corresponds to a "change receiving unit" of the present invention. The change judging unit 338 corresponds to a "first change judging unit", a "second change judging unit", and a "third change judging unit" of the present invention. The pre-change storing unit 339 corresponds to a "first pre-change storing unit" and a "second pre-change unit" of the present invention.

When description will be given for each component configuring the control unit 330, the description will be given referring to FIG. 9 as appropriate. In this case, as to the data constituting the copying origin volume, reference numeral (A) of FIG. 9 conceptually shows the position and the contents of the data and, more specifically, the patterns show the contents of the data. Therefore, for example, when the patterns are different from each other at a same position, this shows that updating of data has been executed at the position. Reference numeral (B) of FIG. 9 shows the copying destination volumes that are stored as snapshots respectively at the time points such as "1:00", "2:00", and "3:00".

For convenience, description will be given assuming that four places are present for each of the copying origin volume and the copying destination volume. Description will be given assuming that, for example, four places of "A", "B", "C", and "D" are present for the copying origin volume and the copying destination volume.

Describing this taking a specific example, as shown by reference numerals (A) and (B) of FIG. 9, updating is executed to "A" and "C" that are the places of the copying origin volume during "1:00" and "2:00" and pieces of data immediately before the updating respectively at "A" and "C" are stored as snapshots produced for the time point of "1:00".

When the allocating unit 331 has received an instruction to execute backing up, the allocating unit 331 allocates storage areas to store snapshots produced for the time point designated by the instruction respectively to each time point designated by the instruction. More specifically, the allocating unit 331 allocates each storage area to store a snapshot produced for a time point correlating the storage area with identification information that identifies the time point designated by an instruction.

For example, when the allocating unit 331 has received an instruction to execute backing up at "1:00", "2:00", and "3:00" from the Host 10, the allocating unit 331 allocates a storage area of 5 gigabytes correlating the area with identification information denoted by each of "first generation", "second generation", and "third generation".

For example, thereafter, when the allocating unit 331 has received from the Host 10 an instruction to execute backing up of the copying origin volume of the present time point (the time point at which the instruction has been issued) at "4:00", the allocating unit 331 allocates a storage area of 5 gigabytes correlating the area with identification information denoted by "fourth generation".

When the copying origin volume is updated after the time point designated by the instruction, the checking unit 332 checks whether the copying origin volume corresponding to the place to which the updating has been executed at an immediately previous time point designated by the instruction is stored in the storage area allocated the allocating unit 331 as a storage area to store the latest snapshot produced for the immediately previous time point.

For example, when a request for updating the copying origin volume has been issued, the checking unit 332 checks the bit map table 321 of the latest generation. That is, for example, in the example shown in FIG. 9, when updating has been executed to "B" and "D" of the copying origin volume at the time point of "5:50", the checking unit 332 checks the bit map table 321 concerning a snapshot at the time point of "5:00".

That is, the checking unit 332 checks whether the data before the updating for "B" and "D" is stored as the snapshot at the time point of "5:00". Describing this taking a specific example, the checking unit 332 checks whether information indicating that updating has been executed to "B" and "D" is stored in the bit map table 321 for the snapshot at the time point of "5:00".

In this case, for example, updating has been executed to "B" and "D" at and after "5:00" and before "5:50" and the data before the updating about "B" and "D" have been already stored, the storing unit 333 confirms that the data is stored. On the other hand, for example, no updating has been executed to "B" and "D" at or after "5:00" and before "5:50" and updating executed at "5:50" is the first updating executed at or after "5:00", the data before the updating about "B" and "D" have not been already stored as the snapshot about "5:00" and the checking unit 332 confirms that the data is not stored.

When the checking unit 332 has confirmed that the data is not stored, the storing unit 333 stores the original data immediately before the updating corresponding to the place to which the updating has been executed in only the storage area to store the latest snapshot as shown in FIG. 10. More specifically, the storing unit 333 stores position information that represents the place for which updating has been executed and the original data immediately before the updating in the place indicated by the position information in a storage area correlated with identification information that identify the time point immediately before that designated by the instruction, correlating the information and the original data.

The storing unit 333 may store the original data immediately before the updating corresponding to the place to which the updating has been executed before the updating.

For example, in the example shown in FIG. 10, in the case where a snapshot has been produced for "first generation", "second generation", and "third generation" at the time when the updating has been executed, when the checking unit 332 has confirms that the original data immediately before the updating is not stored, the storing unit 333 stores the original data immediately before the updating in only the storage are in the snapshot storing unit 201 for the "third generation" that is the latest time point as shown by reference numeral (3) of FIG. 10.

Describing this taking a specific example, when the checking unit 332 confirms that the original data is not stored, the storing unit 333 communicates with the CM 300 that is in charge of the storage area for the latest generation and obtains a capacity from the storage area allocated to the latest generation. That is, for example, in the example shown in FIG. 9, when updating is executed at the time point of "5:50", the storing unit 333 obtains (secures) a storage area to store the original data immediately before the updating from the storage area to store a "fifth generation" that is the latest generation.

For example, the storing unit 333 stores the data before the updating. That is, for example, in the example shown in FIG. 9, when updating has been executed to "B" and "D" at the time point of "5:50", the storing unit 333 stores the original data immediately before the updating in "B" and "D" in the storage area obtained from the storage area to store the "fifth generation".

When the storing unit 333 stores the data before the updating, the storing unit 333 changes the bit map table 321 to "updated". That is, for example, in the example shown in FIG. 9, when the storing unit 333 stores the original data immediately before the updating for "B" and "D", the storing unit 333 changes information in the bit map table 321 concerning the fifth generation to information indicating "updated (updating has been executed)" for the "B" and "D". Describing this taking a specific example, the storing unit 333 changes the information at the positions respectively represent the "B" and "D" in the bit map table 321 concerning the fifth generation from "1" to "0".

The changing unit (not shown in FIG. 4) executes updating to the copying origin volume. That is, for example, the changing unit writes the latest data into the copying origin volume. The changing unit responses to an updating request (that is, for example, information transmitted from the Host 10 and that indicates to execute a change to the copying origin volume). For example, in the case where the changing unit has received an instruction to execute updating, the changing unit executes the updating that the changing unit has received when the storing unit 333 changes the bit map table 321 to "updated" or when the checking unit 332 confirms for the place to execute the updating to that the data is stored.

The read receiving unit 334 receives information indicating to read data from a snapshot, identification information, and position information. For example, the read receiving unit 334 receives information to read data from a snapshot, identification information indicating "third generation", and position information indicating "A", "B", and "C" as information transmitted from the Host 10.

The read judging unit 335 judges whether the original data correlated with the received position information is stored in a storage area correlated with the identification information received by the read receiving unit 334. More specifically, the read judging unit 335 checks the bit map table 321 concerning the snapshot to be stored in the storage area correlated with the received identification information and the read judging unit 335 judges whether the original data correlated with the received position information is stored.

For example, when the read receiving unit 334 has received the identification information indicating "third generation" and the position information indicating "A", "B", and "C", the read judging unit 335 checks the bit map table 321 of the third generation and checks whether the state of the information correlated with "A", "B", and "C" is "1 (not stored)" or "0 (stored)". Describing this referring to the copying destination volume shown in the "third generation" of FIG. 9, the read receiving unit 334 judges that the pieces of position information respectively indicating "A" and "B" are not stored and that the position information indicating "C" is stored.

When it is judged that no data is stored in the storage area correlated with the identification information received by the read receiving unit 334, the read judging unit 335 judges whether the original data correlated with the received position information is stored in the storage area correlated with the identification information indicating a time point after a time period has elapsed compared to the time point identified by the identification information received by the read receiving unit 334.

For example, when no data is stored for the pieces of position information respectively indicating "A" and "B" for the identification information indicating the "third generation", the read judging unit 335 checks the bit map table 321 for the "fourth generation" and the "fifth generation" that respectively indicate time points after a time period has elapsed compared to the "third generation" and the read judging unit 335 checks whether the state of the information correlated with "A" and "B" is "1 (not stored)" or "0 (stored)". Describing this referring to the copying destination volumes respectively shown in the "fourth generation" and the "fifth generation" of FIG. 9, the read receiving unit 334 judges that the data is not stored for the position information indicating "A" and the data is stored in the "fourth generation" and the "fifth generation" for the position information indicating "B".

When the read receiving unit 334 judges that the data is stored, the reading unit 336 reads (obtains) the original data correlated with the received position information from the storage area for which it is judged by the read receiving unit 334 that the data is stored therein. For example, when the read receiving unit 334 receives the identification information indicating the "third generation" and the position information indicating "C" and the read receiving unit 335 judges that the data is stored in the "third generation", the reading unit 336 selects the "third generation" that is the generation for which a read request has been received and the reading unit 336 reads the origin data correlated with the position information indicating "C" from the selected generation ("third generation").

Describing this taking a specific example, the reading unit 336 accesses the storage area of the snapshot storing unit 201 that stores the snapshot of the third generation, obtains the physical address corresponding to the position information indicating "C" (logic address), and reads the original data stored in the obtained physical address.

When a plurality of storage areas for which it is judged by the read judging unit 335 that the data is stored in each thereof are present, the reading unit 336 reads the original data correlated with the received position information from the storage area correlated with the identification information that identifies a time point that is closest to the time point identified by the identification information received by the read receiving unit 334.

For example, when the identification information indicating the "third generation" and the position information indicating "B" are received and it is judged by the read judging unit 335 that the data is stored in the "fourth generation" and the "fifth generation", the reading unit 336 selects the "fourth generation" that is closest to the "third generation" indicated by the received identification information and reads the original data correlated with "B" indicated by the position information of the "fourth generation".

When the read judging unit 335 judges that the data is not stored, the reading unit 336 reads the data in the place designated by the received position information from the original data at the present time point. For example, when the identification information indicating the "third generation" and the position information indicating "A" are received and it is judged by the read judging unit 335 that the data is not stored, describing this taking the example shown in FIG. 9, the reading unit 336 reads the original data correlated with the position information indicating "A" from the copying origin volume at "6:00" that is the current time point.

Describing for the processes executed by the reading unit 336, as shown in FIG. 11, when the backing-up apparatus 20 has received, for example, information instructing to read the data about the snapshot of the "first generation", the backing-up apparatus 20 first checks whether the data in the place to be read is stored in the storage area that stores the snapshot for the "first generation". In this case, the backing-up apparatus 20 stores the data before updating in only the latest generation. Therefore, in the backing-up apparatus 20, when the data is not stored in the "first generation", the reading unit 336 checks whether the data is stored in the latest generation and, when the data is stored, the reading unit 336 reads the data from the generation (for example, the "second generation" in the example shown by reference numeral (3) of FIG. 11). When data is not stored in the place to be read in any of the later generations, in the backing-up apparatus 20, the reading unit 336 reads the data in the place to be read in the copying origin volume of the present time point (for example, the time point at which information instructing to read is received) because no updating process has been executed in the place.

The change receiving unit 337 receives information instructing to execute a change to a snapshot, identification information indicating a storage area having stored therein a snapshot to be changed, and position information indicating the place to which the change is executed. For example, the change receiving unit 337 receives information instructing to change the data of a snapshot, identification information indicating the "third generation", and position information indicating "A", "B", "C" and "D" from the Host 10.

The change judging unit 338 judges whether the original data correlated with the received position information is stored in the storage area correlated with the identification information received by the change receiving unit 337. For example, describing this referring to the example of FIG. 9, when the change receiving unit 337 receives the identification information indicating the "third generation" and the position information indicating "B" and "C", the change judging unit 338 judges that data is not stored in the storage area correlated with the "third generation" indicated by the received identification information for the position information indicating "B" and also judges that the data is stored for "C".

The change judging unit 338 judges whether the original data correlated with the received position information is stored in the storage area correlated with the identification information indicating a previous time point compared with the time point identified by the identification information received by the change receiving unit 337.

For example, describing this referring to the example of FIG. 9, when the change receiving unit 337 has received the identification information indicating the "third generation" and the position information indicating "B" and "C", the change judging unit 338 judges that the data is not stored in the "second generation" that precedes the "third generation" for the position information indicating "B" and also judges that the data is stored in the "second generation" that precedes the "third generation" for "C".

The change judging unit 338 judges whether the original data correlated with the received position information is stored in the storage area correlated with the identification information indicating a time point after a time period has elapsed compared to the time point identified by the identification information received by the change receiving unit 337.

For example, describing this referring to the example of FIG. 9, when the change receiving unit 337 has received the identification information indicating the "third generation" and the position information indicating "A" and "B", the change judging unit 338 judges that the data is not stored in any generation after the "third generation" for the position information indicating "A" and also judges that the data is stored in the "fourth generation" that is after the "third generation" for the position information indicating "B".

The pre-change storing unit 339 stores the data in a storage area correlated with the received identification information and/or a storage area correlated with the identification information that indicates a time point immediately before the identification information based on the judgment result by the change judging unit 338. More specifically, the pre-change storing unit 339 stores the original data at the present time point in the place indicated by the position information received by the change receiving unit 337. Otherwise, the pre-change storing unit 339 stores the data that is stored in the storage area correlated with the identification information that indicates a time period after the identification information received by the change receiving unit 337 and that is the original data in the place indicated by the received position information. Otherwise, the pre-change storing unit 339 stores the data that is stored in the storage area correlated with the identification information received by the change receiving unit 337 and that is the original data in the place indicated by the received position information.

For example, as shown in FIG. 12, the pre-change storing unit 339 stores therein the snapshots respectively for the "first generation", the "second generation", and the "third generation". When a request to execute a change to the "second generation" has been issued and the "first generation" does not have stored therein the data in the place for which the request for the change has been received, the pre-change storing unit 339 withdraws (stores) the data in the place stored as the snapshot for the "second generation", to the "first generation".

Description will be given for the meaning or feature of the operation by the pre-change storing unit 339. When the copying origin volume has been updated, the backing-up apparatus 20 stores the data before the updating in only the storage area to store the snapshot of the latest generations. For example, when the backing-up apparatus 20 reads a position "Y" for the Xth generation, the backing-up apparatus 20 as above first checks whether the data correlated with the position "Y" is stored in the snapshot for the Xth generation and, when the data is not stored, the backing-up apparatus 20 obtains the data correlated with the position "Y" from one of the latest generations (or the copying origin volume at the time point of reading) and the backing-up apparatus 20 reads the obtained data as the data correlated with the position "Y" in the Xth generation.

Therefore, when the backing-up apparatus 20 has changed the data of the snapshot for the "Zth generation", the influence caused by this change spreads not only over the "Zth generation" but also over another generation that the backing-up apparatus 20 thereafter obtains the data in the "Z generation" and reads (desires to read) the obtained data as the data of.

Therefore, even when the pre-change storing unit 339 executes an operation determined using the judgment result by the change judging unit 338, and a table prepared in advance as shown in FIG. 13 or an algorism, etc., retained in advance and, thereby, the pre-change storing unit 339 changes, for example, the data of the snapshot for the "second generation", the backing-up apparatus 20 operates such that the influence caused by this change does not spread over the snapshots for other generations.

Taking a further specific example, description will be given for the operation by the pre-change storing unit 339. As shown in FIG. 13, the pre-change storing unit 339 executes the operation based on an operation pattern obtained by substituting in the table the judgment result obtained by the change judging unit 338. For example, referring to FIG. 14, description will be given for an example shown in a row "4" of FIG. 13. In this case, description will be given for the case where a change is executed to the snapshot for "A" in the "fourth generation" as shown in a row (B) of FIG. 14. The description will be given assuming that the original data correlated with "A" is not stored (not yet transferred) in the "fifth generation" that is after the "fourth generation" and the "third generation" that is immediately before the "fourth generation" as shown in the row (B) of FIG. 14.

In this case, as shown in a row (C) of FIG. 14, the pre-change storing unit 339 transfers the data of "A" of the copying volume at the present time point (for example, the time point of "6:00") to the "fourth generation". The pre-change storing unit 339 transfers the data of "A" of the copying volume at the present time point (for example, the time point of "6:00") to the "third generation" that is immediately before the "fourth generation" and, as shown in a row (D) of FIG. 14, the pre-change storing unit 339 executes the received change. Describing this taking a specific example, the changing unit (not shown in FIG. 4) changes based on the received information the original data stored correlated with the received position information in the storage area correlated with the identification information received by the change receiving unit 337.

Figure 18:
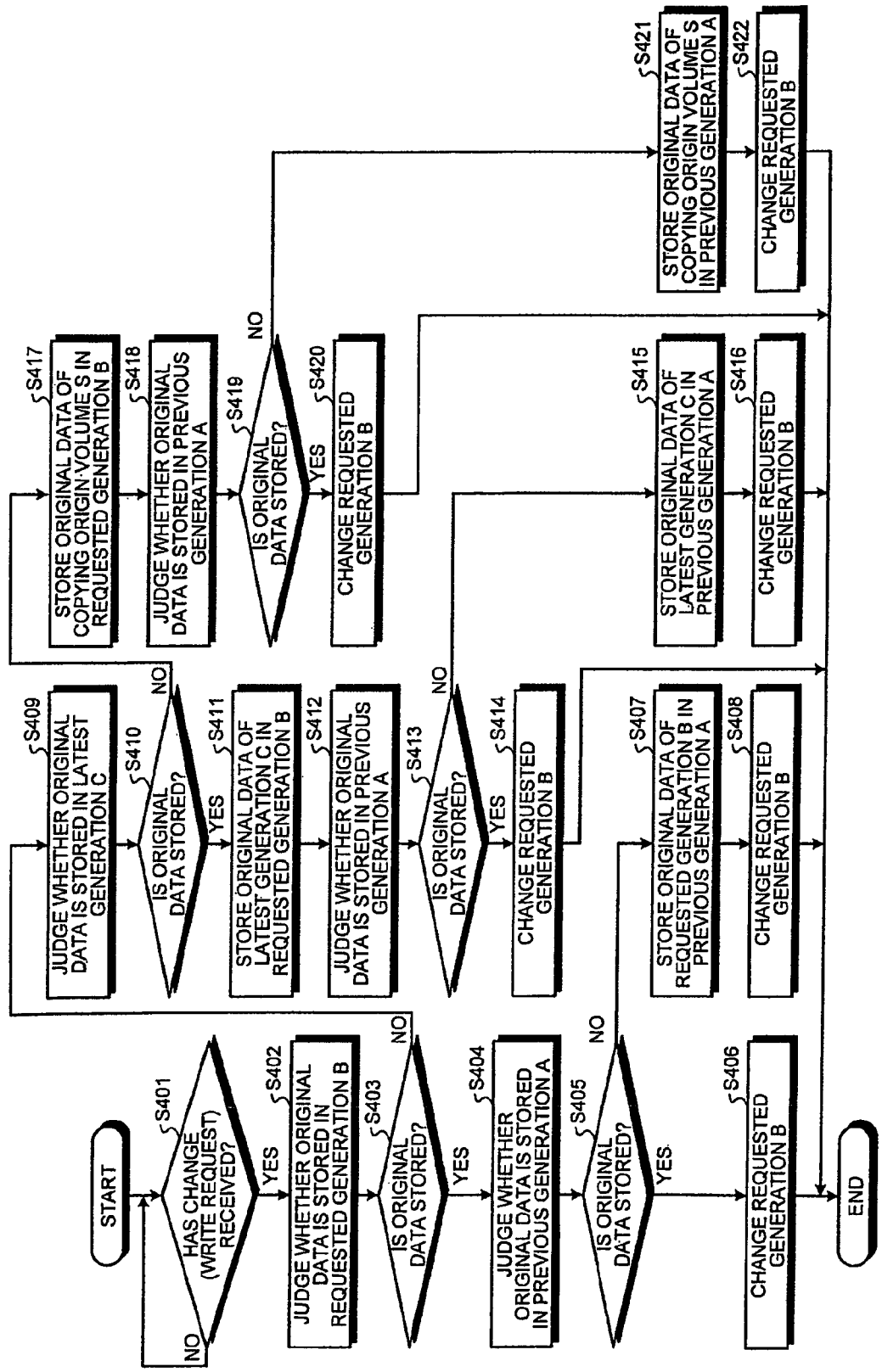
FIG. 18 is an explanatory flowchart of an example of a pre-change storing process by the backing-up apparatus according to the first embodiment.

An example of a pre-change storing process by the backing-up apparatus 20 according to the first embodiment, as shown in FIG. 18, will explain an example of a storage pattern by the pre-change storing unit 339 in the first embodiment shown in FIG. 13. As to an example of the operation pattern not described in the configuration of the backing-up apparatus 20 according to the first embodiment, the description thereof is omitted here because this example of the operation pattern will be described referring to FIG. 18 as an example of a pre-change storing process by the backing-up apparatus 20 according to the first embodiment later.

The backing-up apparatus 20 may also be realized by implementing the functions of the above control unit 330 and the storing unit 320 onto an information processing apparatus such as a known personal computer, a work station, a portable phone, a PHS terminal, a mobile communication terminal, or a PDA (Personal Digital Assistant).

Figure 15:
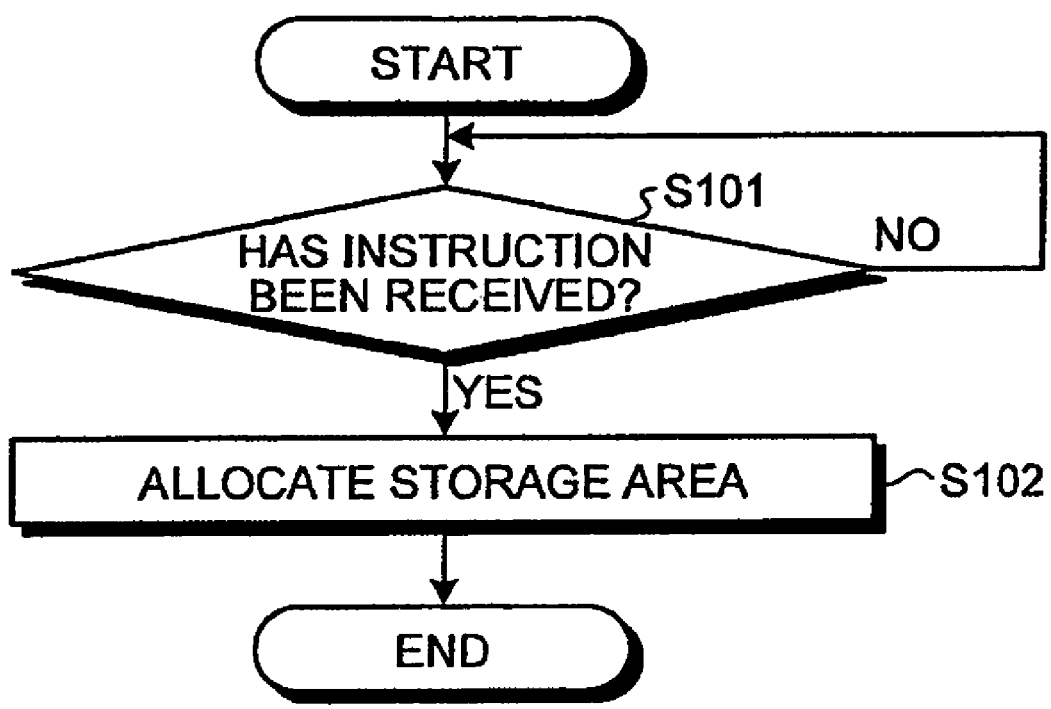
FIG. 15 is an explanatory view of an explanatory flowchart of an example of an allocating process by the backing-up apparatus according to the first embodiment.

Referring to FIG. 15, description will be given for an example of an allocating process by the backing-up apparatus 20 according to the first embodiment. FIG. 15 is an explanatory flowchart of the example of the allocating process by the backing-up apparatus 20 according to the first embodiment.

As shown in FIG. 15, in the case where the allocating unit 331 has received an instruction to execute backing up (Yes at step S101), for example, when the allocating unit 331 receives an instruction to execute backing up at "1:00", "2:00", and "3:00", the allocating unit 331 allocates a storage area to each of the time points designated by the instruction (step S102). For example, the allocating unit 331 allocates a storage area of 5 gigabytes to each of the received "1:00", "2:00", and "3:00".

Figure 16:
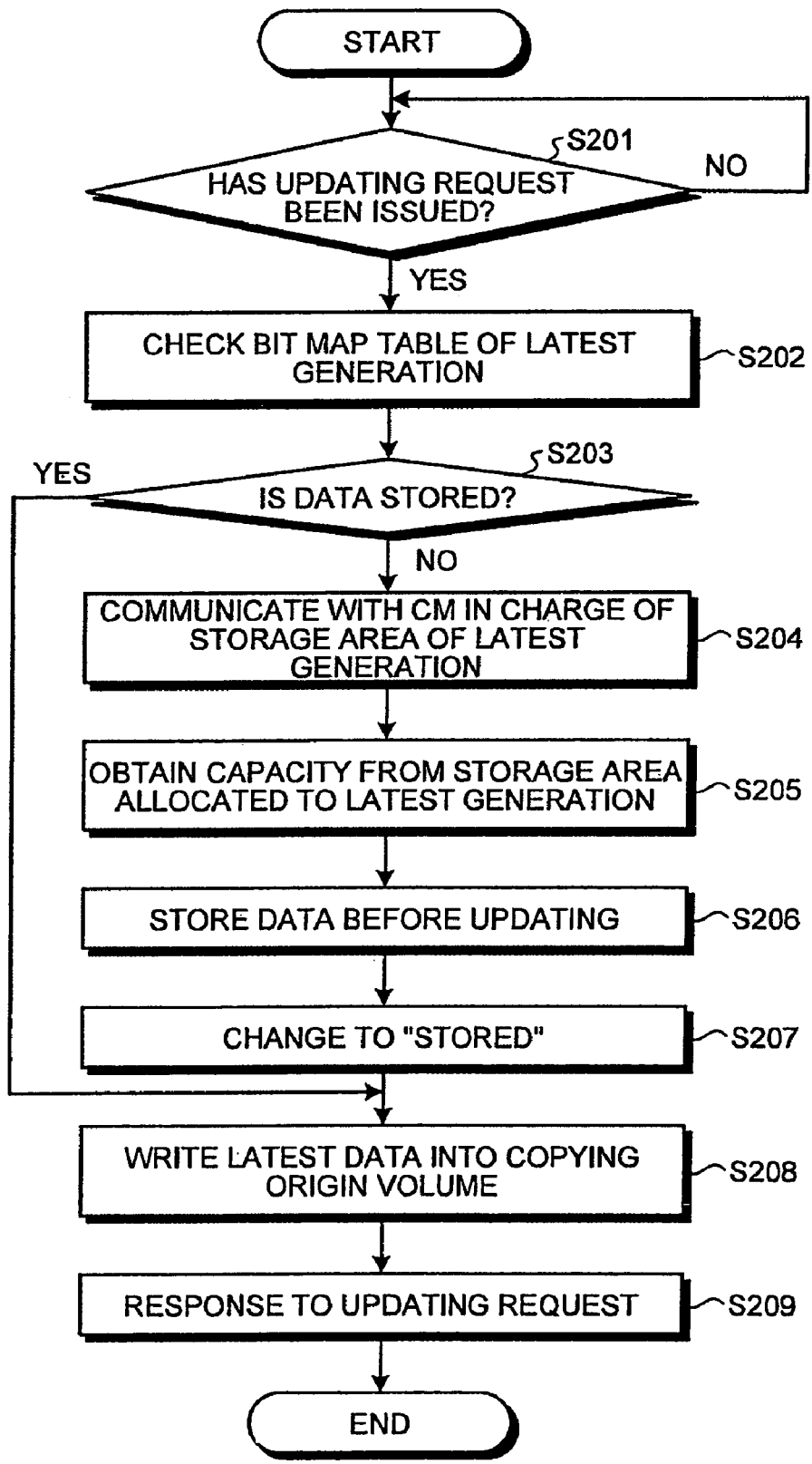
FIG. 16 is an explanatory flowchart of an example of a storing process by the backing-up apparatus according to the first embodiment.

Referring to FIG. 16, description will be given for an example of a storing process by the backing-up apparatus 20 according to the first embodiment. FIG. 16 is an explanatory flowchart of an example of the storing process by the backing-up apparatus 20 according to the first embodiment.

As shown in FIG. 16, when a request for updating has been issued (Yes at step S201), that is, for example, when the copying origin volume is updated after the time point designated by the instruction or, for example, when an instruction to update has been received from the Host 10, the checking unit 332 checks the bit map table 321 of the latest generation (step S202). That is, the checking unit 332 checks whether the data corresponding to the instruction is stored in the storage area for the immediately previous time point.

When the checking unit 332 has confirmed that the data is not stored (No at step S203), the storing unit 333 communicates with the CM 300 that is in charge of the storage area of the latest generation (step S204), and obtains a capacity from the storage area allocated to the latest generation (step S205). Thereafter, the storing unit 333 stores the data before the updating (step S206). That is, the storing unit 333 stores the original data immediately before the updating corresponding to the place to which the updating has been executed in only the storage area that stores the latest snapshot.

The storing unit 333 changes the bit map table 321 to "stored" (step S207). For example, the storing unit 333 changes the information corresponding to the place to which the updating has been executed from "1" to "0" in the bit map table 321.

The changing unit writes the latest data into the copying origin volume (step S208). The changing unit responses to the updating request (step S209). When the checking unit 332 similarly has confirmed that the data has been stored at the above step S203 (Yes at step S203), the storing unit 333 write the latest data into the copying origin volume (step S208). The storing unit 333 responses to the updating request (step S209).

Figure 17:
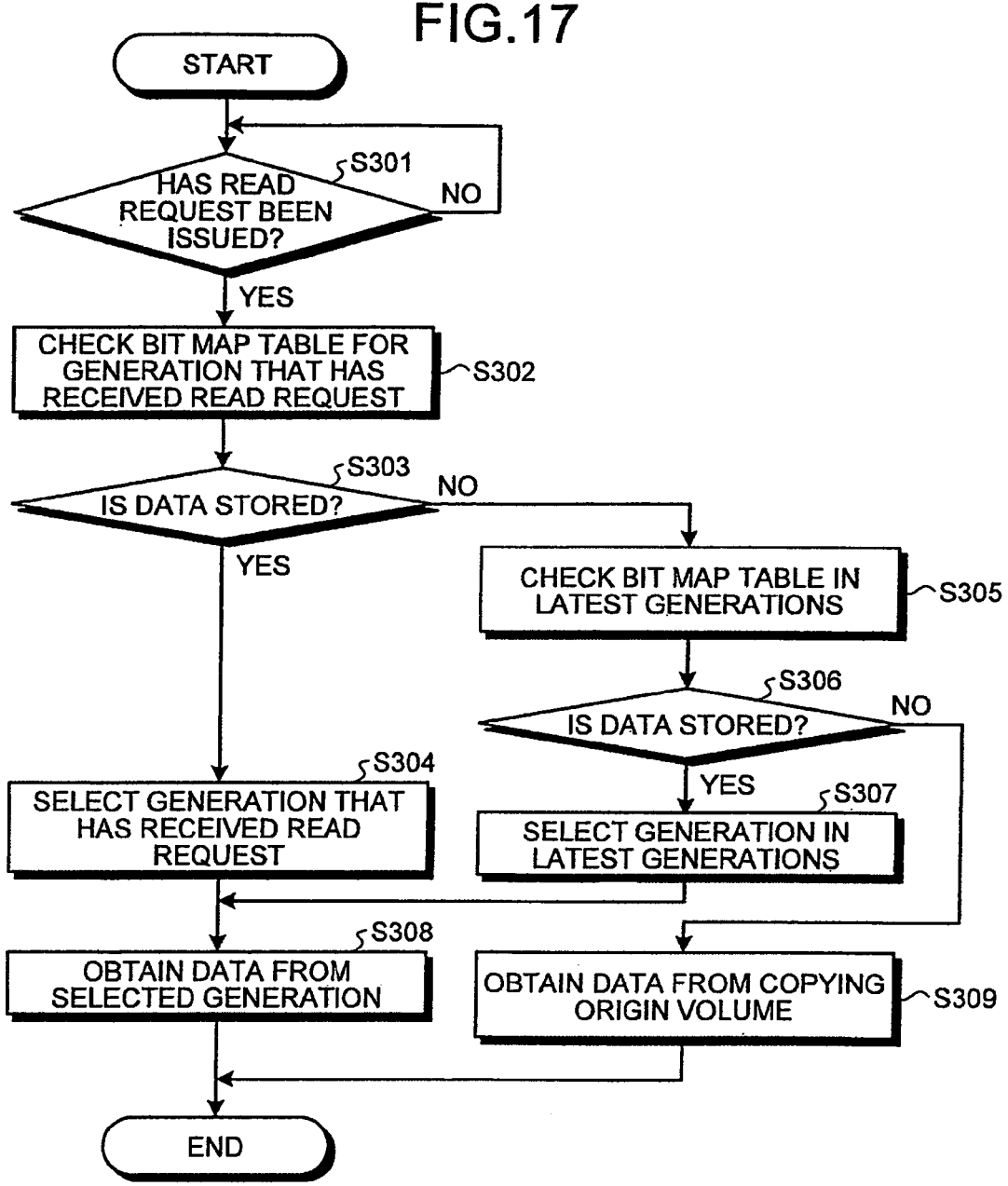
FIG. 17 is an explanatory flowchart of an example of a reading process by the backing-up apparatus according to the first embodiment.

Referring to FIG. 17, description will be given for an example of a reading process by the backing-up apparatus 20 according to the first embodiment. FIG. 17 is an explanatory flowchart of the example of the reading process by the backing-up apparatus 20 according to the first embodiment.

As shown in FIG. 17, when a read request has been issued (Yes at step S301), that is, when the read receiving unit 334 has received information indicating to read data from a snapshot, identification information, and position information, the read judging unit 335 checks the bit map table 321 for the generation for which the read request has been received (step S302). That is, the read judging unit 335 judges whether the original data correlated with the received position information is stored in the storage area correlated with the identification information received by the read receiving unit 334.

When the read judging unit 335 judges that the data is stored (Yes at step S303), the reading unit 336 selects the generation for which the read request has been received (step S304). That is, the reading unit 336 selects the identification information received by the read receiving unit 334.

On the other hand, when the read judging unit 335 judges that the data is not stored (No at step S303), the read judging unit 335 checks the bit map table 321 in the latest generations (step S305). For example, when the received identification information indicates the "third generation", the read judging unit 335 checks the bit map table 321 for the "fourth generation" and the "fifth generation" that indicate the time points after a time period has elapsed compared to the "third generation".

When the read judging unit 335 judges that the data is stored (Yes at step S306), the reading unit 336 selects the closest generation in the latest generations that are judged to be stored (step S307).

The reading unit 336 obtains the data from the selected generation (step S308). For example, when the selected generation is the "third generation" and the position information indicates "C", the reading unit 336 reads the original data correlated with the position information indicating "C" of the "third generation".

On the other hand, when the read judging unit 335 judges that the data is not stored (No at step S306), the reading unit 336 obtains the data from the copying origin volume (step S309). For example, when the position information that indicates the place of the data to be read is "C" and the present time point is "6:00", the reading unit 336 reads the original data correlated with the position information indicating "C" from the copying origin volume at "6:00".

Referring to FIG. 18, description will be given for an example of a pre-change storing process by the backing-up apparatus 20 according to the first embodiment. FIG. 18 is an explanatory flowchart of the example of the pre-change storing process by the backing-up apparatus 20 according to the first embodiment. In FIG. 18, identification information indicating a snapshot to be changed is described as a "B generation (a requested generation B)", a generation after the "B generation" is defined as a "C generation (the latest generation C)", and the copying origin volume at the present time point is defined as a copying origin volume "S".

As shown in FIG. 18, when a change request (Write request) has been received (Yes at step S401), that is, when the change receiving unit 337 has received information indicating to execute a change to a snapshot, identification information (indicating the generation B), and position information, the change judging unit 338 judges whether the original data is stored in the requested generation B (step S402).

When the change judging unit 338 judges that the original data is stored in the requested generation B (Yes at step S403), the change judging unit 338 judges whether the original data is stored in the previous generation A (step S404).

When the change judging unit 338 judges that the original data is stored in the previous generation "A" (Yes at step S405), the changing unit changes the requested generation B (step S406). For example, the changing unit executes a change according to the received information indicating to execute the change.

On the other hand, at the above step S405, when the change judging unit 338 judges that the data is not stored in the previous generation A (No at step S405), the pre-change storing unit 339 stores the original data of the requested generation B in the previous generation A (step S407). More specifically, the pre-change storing unit 339 reads the original data correlated with the received position information from the storage area of the generation B and stores this original data in the storage area of the previous generation A for which it has been judged that any data is not stored therein, before the change is executed to the place indicated by the received position information.

The changing unit executes the change to the requested generation B (step S408).

When the change judging unit 338 judges that the original data is not stored in the requested generation B at the above step S403 (No at step S403), the change judging unit 338 judges whether the original data is stored in the latest generation C (step S409).

In this case, when the change judging unit 338 judges that the original data is stored in the latest generation C (Yes at step S410), the pre-change storing unit 339 stores the original data of the latest generation C in the requested generation B (step S411). More specifically, the pre-change storing unit 339 reads the original data correlated with the received position information from the latest generation C for which it has been judged at step S410 that the data is stored therein and stores this original data in the storage area of the generation B, before the change is executed to the place indicated by the received position information.

The change judging unit 338 judges whether the original data is stored in the previous generation A (step S412).

In this case, when the change judging unit 338 judges that the original data is stored in the previous generation A (Yes at step S413), the changing unit executes a change to the requested generation B (step S414).

On the other hand, when the change judging unit 338 judges that the original data is not stored in the previous generation A at the above step S413 (No at step S413), the pre-change storing unit 339 stores the original data of the latest generation C in the previous generation A (step S415). More specifically, the pre-change storing unit 339 reads the original data correlated with the received position information from the latest generation C for which the change judging unit 338 judges that the data is stored therein and stores this original data in the storage area of the previous generation A for which the change judging unit 338 judges that the data is not stored therein, before the change is executed to the place indicated by the received position information.

The changing unit executes the change to the requested generation B (step S416).

On the other hand, when the change judging unit 338 judges that the original data is not stored in the latest generation C at the above step S410 (No at step S410), the pre-change storing unit 339 stores the original data of the copying origin volume S in the requested generation B (step S417). More specifically, the pre-change storing unit 339 reads the data in the place indicated by the received position information from the copying origin volume S and stores this data in the storage area of the generation B, before the change is executed to the place indicated by the received position information.

The change judging unit 338 judges whether the original data is stored in the previous generation A (step S418).

In this case, when the change judging unit 338 judges that the original data is stored in the previous generation A (Yes at step S419), the changing unit executes a change to the requested generation B (step S420).

On the other hand, when the change judging unit 338 judges that the original data is not stored in the previous generation A at the above step S419 (No at step S419), the pre-change storing unit 339 stores the original data of the copying origin volume S in the previous generation A (step S421). More specifically, the pre-change storing unit 339 reads the data in the place indicated by the received position information from the copying origin volume S and stores this data in the storage area of the previous generation A for which the change judging unit 338 judges that the data is not stored therein, before the change is executed to the place indicated by the received position information.

The changing unit executes the change to the requested generation B (step S422).

In the case where a plural pieces of identification information that each indicate a previous time point compared to the time point identified by the identification information received by the change receiving unit 337 are present, when it is judged that the data is not stored in the storage area correlated with immediately-close-time-point identification information that identifies a time point that is closest to the time point identified by the received identification information, the pre-change storing unit 339 stores the data in the storage area correlated with the immediately-close-time-point identification information before a change is executed to the place indicated by the received position information.

Describing this referring to, for example, the example of FIG. 9, when a change is executed to the "third generation", the pre-change storing unit 339 judges whether the original data is stored for the "second generation". When the pre-change storing unit 339 judges that the original data is not stored, the pre-change storing unit 339 stores the original data in the "second generation". That is, the pre-change storing unit 339 executes no process for the "first generation".

When the change judging unit 338 judges that a plural pieces of identification information that each indicate a later time point compared to the time point identified by the identification information received by the change receiving unit 337 are present, the pre-change storing unit 339 reads the original data correlated with the received position information from the storage area correlated with the immediately-close-time-point identification information of the plurality of storage areas.

For example, describing this referring to FIG. 9, when a change is executed to "B" of the "third generation", the pre-change storing unit 339 stores therein the original data correlated with the "B" in the "fourth generation" and the "fifth generation" that represent time points after the "third generation". In this case, the pre-change storing unit 339 reads the original data from the "fourth generation".

As above, when the backing-up apparatus 20 has received an instruction to execute backing up, the backing-up apparatus 20 allocates a storage area to store a snapshot produced for each time point designated by the instruction to each time point designated by the instruction. When the original data is updated after the time point designated by the instruction, the backing-up apparatus 20 checks whether the original data corresponding to the place for which the updating has been executed at a immediately previous time point is stored in the storage area allocated as a storage area to store the latest snapshot produced for the immediately previous time point. When it has been confirmed that the data is not stored therein, the backing-up apparatus 20 stores the original data immediately before the updating corresponding to the place for which the updating has been executed in only the storage area to store the latest snapshot. Therefore, when a snapshot is produced, the transfer amount of data to be stored from the original data to the storage area can be reduced.

For example, as described in the above description regarding the premise technology, the backing-up apparatus 20 that executes the conventional SnapOPC stores the copying origin volume immediately before the updating corresponding to the place for which the updating has been executed in each of the storage areas that do not have stored therein the copying origin volume immediately before the updating corresponding to the place.

For example, describing this referring to FIG. 3 and taking an example of an updating process executed at "5:00", the backing-up apparatus 20 stores the copying origin volume immediately before the updating in "C" of the copying origin volume in not only a predetermined storage area (the storage area shown by reference numeral (5) of FIG. 3) to store a snapshot produced for the time point of "4:00" but also a predetermined storage area (the storage area shown by reference numeral (4) of FIG. 3) to store a snapshot produced for the time point of "1:00".

Whereas, as shown by reference numeral (11) of FIG. 3, the backing-up apparatus 20 does not store the copying origin volume immediately before the updating in "B" and "C" of the copying origin volume in a predetermined storage area (the storage area shown by reference numeral (4) of FIG. 3) to store a snapshot produced for the time point of "1:00" even when the copying origin volume immediately before the updating in "B" and "C" of the copying origin volume is not stored therein. Thereby, the transfer amount compared to the conventional SnapOPC can be reduced.

The backing-up apparatus 20 further allocates a storage area correlating with identification information and stores position information and the original data immediately before the updating in the place indicated by the position information correlating the position information and the original data in a storage area correlated with the identification information. The backing-up apparatus 20 receives information indicating to read the data from the snapshot, identification information, and position information and judges whether the original data correlated with the received position information is stored in the storage area correlated with the received identification information. When it has been judged that the original data is not stored in the B generation, the backing-up apparatus 20 judges whether the original data correlated with the received position information is stored in the storage area correlated with the identification information that indicates a time point after a time period has elapsed compared to the time point identified by the received identification information. When it has been judged that the original data is stored in the B generation, the backing-up apparatus 20 reads the original data correlated with the received position information from the storage area for which it has been judged that the original data is stored therein. When it has been judged that the original data is stored in the A generation, the backing-up apparatus 20 reads the original data correlated with the received position information from the storage area for which it has been judged that the original data is stored therein. Further, when it has been judged that the original data is not stored in the A generation, the backing-up apparatus 20 reads the data in the place indicated by the received position information from the original data at the present time point. Therefore, in an approach of storing the original data immediately before the updating corresponding to the place for which the updating has been executed in only the storage area to store the latest snapshot, the backing-up apparatus 20 can securely read the data that constitutes each of the snapshots.

For example, as described in the above description regarding the premise technology, the backing-up apparatus 20 that executes the conventional SnapOPC stores the original data immediately before the updating corresponding to the place for which the updating has been executed in all the storage areas to store a snapshot produced for a time point before the time point at which the updating is executed. Therefore, when the backing-up apparatus 20 that executes the conventional SnapOPC reads the data that constitutes a snapshot produced for a time point designated by a user, the backing-up apparatus 20 checks whether the data is stored in the storage area to store the snapshot at the time point and, when the data is not stored, the backing-up apparatus 20 only have to read the data from the original data.

In such an approach of reading the data that constitutes a snapshot by the backing-up apparatus 20 that executes the conventional SnapOPC, the correct data can not be read in an approach of storing the original data immediately before the updating in only the storage area to store the latest snapshot.

In contrast to the above-mentioned approach, when the backing-up apparatus 20 reads the data that constitutes a snapshot produced for a time point designated by a user, the backing-up apparatus 20 checks whether the data is stored in the storage area to store a snapshot at the time point. When the data is not stored, the backing-up apparatus 20 judges whether the data is stored in the storage area that stores the snapshot produced for a time point after a time period has elapsed compared to the time point. Further, when the data is stored therein, the backing-up apparatus 20 reads the data therefrom. Therefore, the backing-up apparatus 20 can securely read the data that constitutes each snapshot.

When a plurality of storage areas of the A generation for which it has been judged that the data is stored therein are present, the backing-up apparatus 20 further reads the original data correlated with the received position information from the storage area correlated with the identification information that identifies a time point that is closest to the time point identified by the received identification information. Therefore, the backing-up apparatus 20 can execute the processing using a proper snapshot even when snapshots are produced respectively at a plurality of time points.

For example, when the data of a snapshot for the "Zth generation" has been changed, the backing-up apparatus 20 operates such that the influence caused by this change does not spread over the snapshots for other generations. Therefore, the backing-up apparatus 20 can change a designated snapshot without influencing the snapshots other than the snapshot to be changed.

When a plural pieces of identification information that respectively indicate preceding time points compared with the time point identified by the received identification information are present or when a plurality of storage areas of the C generation for which it is judged that data is stored therein are present, the backing-up apparatus 20 can execute the processing using a proper snapshot.

In the first embodiment, an approach of adding another storage area to the storage area allocated for each time point at which a snapshot is produced has not been referred to. However, the present invention is not limited to the first embodiment and another storage area may be added.

Figure 19:
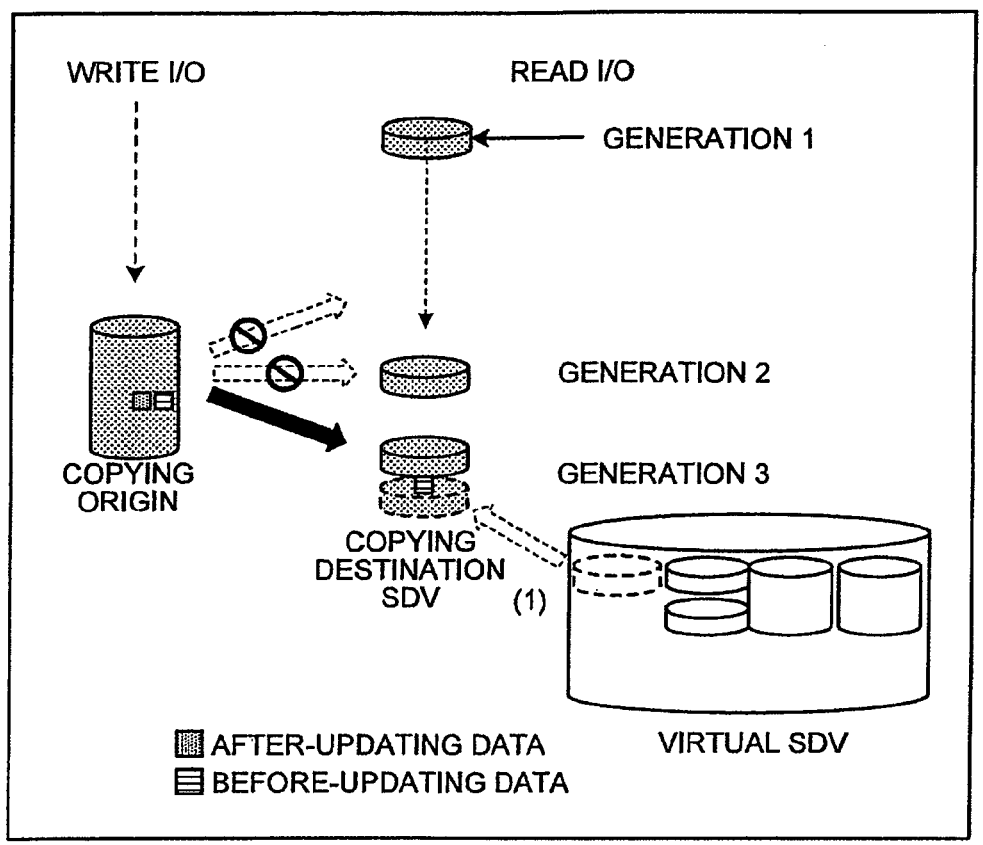
FIG. 19 is an explanatory view of advantages of the backing-up apparatus according to a second embodiment of the present invention.

That is, as shown in FIG. 19, as to the storage area to be allocated in advance to each time point (for example, the "first generation", the "second generation", and the "third generation") for which a snapshot is produced, the backing-up apparatus 20 according to a second embodiment sets a logic capacity of the storage area that is equal to (or larger than) that of the copying origin volume while the backing-up apparatus 20 sets the physical capacity of the storage area that is small compared to that of the copying origin volume. This is because, as above, the backing-up apparatus 20 stores only the data before the updating corresponding to the place for which the updating has been executed. Therefore, the back-ing-up apparatus 20 causes a capacity overflow in the storage area allocated in advance when the updated amount of the copying origin volume is larger than its estimated amount.

Therefore, when the capacity overflow occurs, the backing-up apparatus 20 according to the second embodiment prevents the occurrence of the capacity overflow by adding a storage capacity from a virtual volume of a predefined standby system (a storage medium prepared in advance). That is, for example, when the storage area allocated by the allocating unit can not have data stored therein as shown by reference numeral (1) of FIG. 20, the backing-up apparatus 20 according to the second embodiment stores the data in a storage area that has been added in advance as shown by reference numeral (2) of FIG. 20.

In the following, referring to FIGS. 21 to 25, description will be given for an approach of adding a storage area to the storage area allocated for each time point at which a snapshot is produced. In the following, a storage area added by an adding unit described later is described as a virtual volume (or a virtual SDV).

Figure 24:
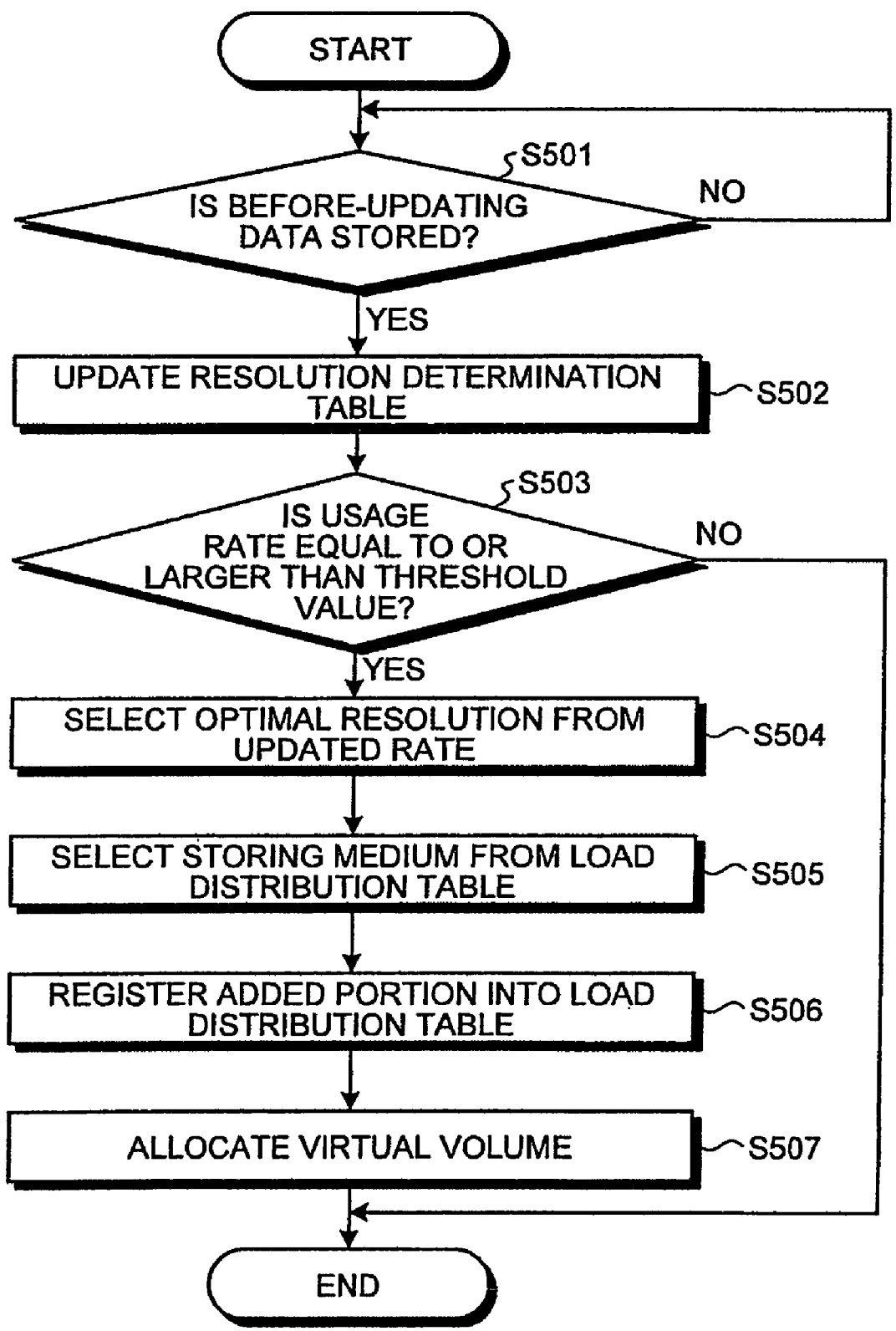
FIG. 24 is an explanatory flowchart of a virtual volume adding process by the backing-up apparatus according to the second embodiment.
Figure 25:
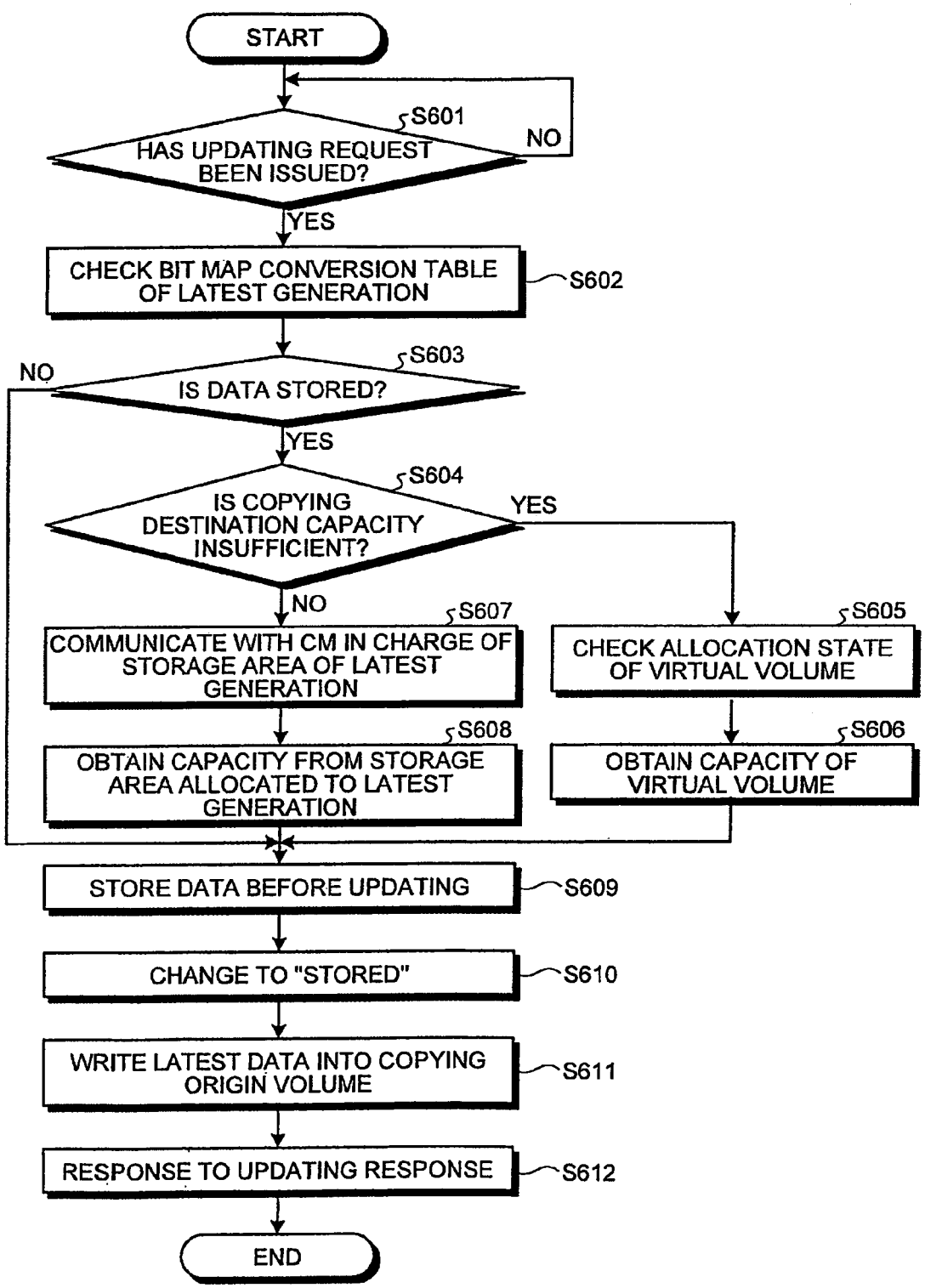
FIG. 25 is an explanatory flowchart of a storing process by the backing-up apparatus according to the second embodiment.

FIG. 19 is an explanatory view of advantages of the backing-up apparatus according to the second embodiment. FIG. 20 is an explanatory view of the advantages of the backing-up apparatus according to the second embodiment. FIG. 21 is an explanatory view of an SDV management table in the second embodiment. FIG. 22 is an explanatory view of a resolution determination table in the second embodiment. FIG. 23 is an explanatory view of a load distribution table in the second embodiment. FIG. 24 is an explanatory view of a virtual volume adding process by the backing-up apparatus according to the second embodiment. FIG. 25 is an explanatory flowchart of a storing process by the backing-up apparatus according to the second embodiment.

In addition to the components of the backing-up apparatus 20 according to the first embodiment shown in FIG. 4, as described later, the backing-up apparatus 20 according to the second embodiment includes a resolution determination table, a load distribution table, a monitoring unit, a capacity determining unit, an adding unit, a managing unit, a calculating unit, and a determining unit. The load distribution table corresponds to a "capacity table" of the present invention. The monitoring unit corresponds to a "monitoring unit" of the present invention. The adding unit corresponds to an "adding unit" of the present invention.

The backing-up apparatus 20 according to the second embodiment includes a storing apparatus configured by a plurality of storing media each having a capacity that is the predetermined upper limit capacity. For example, the backing-up apparatus 20 includes a storage apparatus (a storing apparatus) configured by a plurality of disc apparatuses (storing media). In this case, each of the storing media is uniquely identified. For example, a disc apparatus is added with information that identifies the disc apparatus from other disc apparatuses such as "Disc 1", "Disc 2", or "Disc 3".

The SDV management table 323 of the backing-up apparatus 20 according to the second embodiment stores therein the information to manage storage areas (SDV) allocated by the allocating unit 331 as shown by reference numeral (1) of FIG. 21 and further stores therein, for each virtual volume, information to manage a virtual volume allocated as a storage area to store a snapshot as shown by reference numeral (2) of FIG. 21. The SDV management table 323 of the backing-up apparatus 20 is input by the adding unit described later with information on the virtual volume added by the adding unit and the SDV management table 323 stores this input information.

For example, in the example of reference numeral (2) of FIG. 21, the SDV management table 323 of the backing-up apparatus 20 according to the second embodiment stores therein a "used amount", a "starting physical address", and a "current used LBA" correlating these items with a "virtual volume identifying number" that is information that uniquely identifies each virtual volume. Describing this taking a specific example, the SDV management table 323 stores therein a used amount of "3 G", a starting physical address of "100", and a current used LBA of "100, 110, . . . " correlating these items with a virtual volume identifying number of "1".

As shown by reference numeral (3) of FIG. 21, the SDV management table 323 of the backing-up apparatus 20 according to the second embodiment stores therein the relation between a storage area allocated by the allocating unit 331 and a virtual volume added by the adding unit described later. For example, in the example shown by reference numeral (3) of FIG. 21, the SDV management table 323 stores therein a virtual volume identifying number correlating this number with each storage area allocated by the allocating unit 331. Describing this taking a specific example, in the example shown by reference numeral (3) of FIG. 21, the SDV management table 323 stores therein virtual volume identifying numbers "1, 2" correlating these numbers with a "first generation SDV" allocated as the storage area to which snapshots of the first generation are allocated.

As shown by reference numeral (4) of FIG. 21, the SDV management table 323 of the backing-up apparatus 20 according to the second embodiment stores therein each virtual volume linking the volume to (using a linking structure) a time point at which a snapshot is produced (or a storage area to store the snapshot for the time point (or identifying information of the storage area)). Because the number of virtual volumes to be simultaneously allocated is not constant at the time point at which virtual volumes to be added are added for each time point at which a snapshot is produced, the SDV management table 323 stores, for example, using the linking structure.

The resolution determination table of the backing-up apparatus 20 according to the second embodiment stores therein information used when the capacity of a virtual volume to be allocated is determined. More specifically, the resolution determination table stores therein data used by the monitoring unit described later and the capacity determining unit described later and the information stored therein is updated by the monitoring unit described later every time some processing is executed. For example, when a process of storing data in a storage area is executed by the storing unit 333, the monitoring unit changes the value of the updated amount and also changes the usage rate and the updated rate in the resolution determining table.

For example, as shown in FIG. 22, the resolution determination table of the backing-up apparatus 20 according to the second embodiment stores therein a "backing up elapsed time [h]" that represents the interval between generations, a "usage rate [%]" that represents the rate that the used capacity accounts for in the capacity of a storage area (SDV), an "updated amount [MB]" that represents the capacity of the updated data, and an "updated rate [MB/h]" that is calculated from the updated amount and the elapsed time, correlating these items with a "generation" that represents the time point at which a snapshot is produced.

For example, in the example shown in FIG. 22, the resolution determination table of the backing-up apparatus 20 according to the second embodiment stores therein a backing up elapsed time of "elapsed time 1", a usage rate of "usage rate 1", an updated amount of "updated amount 1", and an updated rate of "updated rate 1" correlating these items with a generation "1". Though the description has been given using terms (for example, an "elapsed time 1") as information stored in the resolution determination table in FIG. 22, the information is stored as numerical values in practice.

The load distribution table of the backing-up apparatus 20 according to the second embodiment stores therein a used capacity that represents the total of the capacity of the storage area added by the adding unit described later for each storing medium. More specifically, the managing unit described later manages information stored in the load distribution table and the information is used by the calculating unit described later.

For example, as shown in FIG. 23, the load distribution table of the backing-up apparatus 20 according to the second embodiment stores therein a "Disc used" that represents the storing medium used when the virtual volume is added, and a "used amount [MB]" that represents the capacity (added by the adding unit described later) used as the virtual volume identified by the "virtual volume identifying number" correlating these items with a "virtual volume identifying number".

Describing this taking a specific example, in the example shown in FIG. 23, the load distribution table of the backing-up apparatus 20 according to the second embodiment stores therein discs used of "Disc 1, Disc 2, and Disc 3" and a used amount of "used amount 1" correlating these items with a virtual volume identifying number of "1".

The monitoring unit monitors an unused capacity of each storage area for each storage area allocated by the allocating unit 331. More specifically, the monitoring unit monitors an unused capacity of each storage area (SDV) or each virtual volume by checking the resolution determination table. The monitoring result by the monitoring unit is used by the adding unit described later.

For example, when data before updating is stored in the snapshot storing unit 201 or when a value in the bit map table 321 is changed ("1" to "0") and the resolution determination table is updated, the monitoring unit updates the resolution determination table. For example, the monitoring unit monitors whether the updated usage rate is equal to or larger than a predetermined threshold value.

Describing this taking a specific example, in the resolution determination table, the monitoring unit updates the value of the updated amount and also updates the usage rate and the updated rate. For example, when the predetermined threshold value is "90%", the monitoring unit monitors whether the usage rate is equal to or larger than "90%".

The monitoring unit may monitor the unused capacity for only the storage area to store the snapshot of the latest generation. The storage area for which a capacity overflow is worried is the storage area to store the snapshot of the latest generation to which the data before the updating is transferred, and the backing-up apparatus 20 can quickly and securely execute processing by limiting the target of its monitoring.

When a storage area (a virtual SDV) is added correlated with identification information by the adding unit described later, the capacity determining unit determines the capacity of the storage area (the virtual SDV) to be added based on the time interval between a time point identified by the identification information and a time point that is closest to the time point, and the capacity of data stored in the storage area against an elapsed time elapsed since the data has been stored in the storage area correlated with the identification information. More specifically, the capacity determining unit determines the proper capacity of a virtual volume using the resolution determination table.

For example, when a storage area of "5 G" is allocated to a storage area to store a snapshot of a latest generation and the updated rate is "10 GB/h", the capacity determining unit determines a virtual volume of, for example, "5 G to 10 G".

As above, the capacity determining unit variably determines the addition unit of the virtual volume considering the interval between generations (the interval between generation backing up) and the updated amount between them. The capacity determining unit relieves the virtual volume that is unnecessary anymore by deleting a generation, etc., and moves this virtual volume to a stand-by system. Thereby, the capacity determining unit realizes a distribution that is not so wasteful.

The managing unit manages a capacity table that has stored therein the used capacity that represents the total of the capacities of the storage area added by the adding unit described later. More specifically, the managing unit updates the information stored in the load distribution table when a relevant process is executed. For example, when a virtual volume is added by the adding unit described later, the managing unit stores a "virtual volume identifying number", a "Disc used", and a "used amount" in the load distribution table for the added virtual volume and, thereby, updates the load distribution table.

The calculating unit calculates, for each storage medium, the used rate that represents the rate that the used capacity accounts for in the predetermined upper limit capacity of each storing medium for each storing medium stored in the load distribution table managed by the managing unit. More specifically, the calculating unit calculates the used rate for each storing medium.

For example, the calculating unit calculates the total of the used amount that represents the used capacity for each "Disc used" using the correlation between the "Disc used" and "used amount" stored in the load distribution table. The calculating unit calculates the usage rate for each Disc used from the calculated used amount and the predetermined upper limit capacity for each Disc used.

As shown in FIG. 23, the second embodiment uses a plurality of storing media as a unit and, therefore, the calculating unit calculates the usage rate for each one unit. For example, in a RAID apparatus, to protect the data by redundancy, a plurality of discs form one RAID group and a volume is formed in the group. Therefore, a plurality of discs is usually present in the RAID apparatus. For example, describing this taking the example shown in FIG. 23, the calculating unit calculates a usage rate for "Disc 1, Disc 2, and Disc 3" as one unit, also calculates a usage rate for "Disc 5 and Disc 6" as one unit, and also calculates a usage rate for "Disc 7, Disc 8, and Disc 9" as one unit.

The determining unit determines a storage area to be added by the adding unit described later from the storing medium that shows the lowest usage rate of the usage rates calculated by the calculating unit. More specifically, when a plurality of storing media is present, the determining unit determines a storing medium for which the calculating unit has calculated the lowest usage rate.

For example, the determining unit selects a storing medium from the load distribution table. Describing this taking a specific example, when the calculating unit has calculated the usage rate of the "Disc 1, Disc 2, and Disc 3" as "20%", the usage rate of the "Disc 5 and Disc 6" as "90%", and usage rate of the "Disc 7, Disc 8, and Disc 9" as "85%", the determining unit determines the "Disc 1, Disc 2, and Disc 3" for which the lowest usage rate has been calculated.

When the monitoring unit has obtained the monitoring result indicating that the unused capacity becomes equal to or smaller than a predetermined threshold value, the adding unit newly adds a storage area correlating the storage area with the identifying information correlated with the storage area for which the monitoring result has obtained. More specifically, when the monitoring unit has obtained the monitoring result indicating that the unused capacity becomes equal to or smaller than a predetermined threshold value, the adding unit newly adds a storage area from the storing medium determined by the calculating unit according to the capacity determined by the capacity determining unit.

For example, the adding unit registers the added area into the load distribution table and adds a virtual volume. Describing this taking a specific example, when the capacity determining unit has determined that "5 G" is allocated and the calculating unit has determined "Disc 1, Disc 2, and Disc 3", the adding unit causes the managing unit to store the discs used "Disc 1, Disc 2, and Disc 3" and the used amount "5 G" in the load distribution table correlating these items with a "virtual volume identifying number (for example, "6")" to be newly provided. The adding unit allocates a storage area of "5 G" from the "Disc 1, Disc 2, and Disc 3". The adding unit executes this allocation prior to occurrence of a capacity overflow.

The adding unit can prevents a user from giving special attention to a capacity overflow of the storage areas and can also prevent the capacity overflow by automatically executing the addition of the virtual volume.

The storing unit 333 has data stored in the storage area (SDV) allocated by the allocating unit 331 and the virtual volume added by the adding unit. For example, when the checking unit 332 has confirmed that the original data immediately before the updating is not stored, the storing unit 333 checks whether a copying destination capacity is insufficient. Describing this taking a specific example, the storing unit 333 checks whether a capacity to store the data is present in the storage area (SDV) allocated by the allocating unit 331.

For example, when the copying destination capacity is insufficient, the storing unit 333 checks the allocation state of the virtual volumes and obtains the capacity of the virtual volumes. Describing this taking a specific example, the storing unit 333 checks the virtual volume correlated with the generation for which the data is stored (or to the storage area to store the data) from the SDV management table 323 and the storing unit 333 secures the capacity to store the data in the virtual volume.

The reading unit 336 reads the data from the storage area (SDV) allocated by the allocating unit 331 or the virtual volume added by the adding unit. For example, when the reading unit 336 has selected a generation to read, the reading unit 336 checks whether any virtual volume has been added correlated with the generation and reads the data from the storage area (SDV) or the virtual volume.

Similarly to the storing unit 333, the pre-change storing unit 339 stores the data in the storage area (SDV) allocated by the allocating unit 331 or the virtual volume added by the adding unit before a change is executed to a snapshot.

Referring to FIG. 24, description will be given for a virtual volume adding process by the backing-up apparatus 20 according to the second embodiment.

As shown in FIG. 24, in the backing-up apparatus 20 according to the second embodiment, when a storing process of the data before updating is executed (Yes at step S501), the monitoring unit updates the resolution determination table (step S502). For example, the monitoring unit updates the value of the updated amount and updates the usage rate and the updated rate in the resolution determination table.

When the monitoring unit monitors that the usage rate is not equal to or larger than the threshold value (No at step S503), the process comes to an end. On the other hand, when the monitoring unit monitors that the usage rate is equal to or larger than the threshold value (Yes at step S503), the capacity determining unit selects the optimal resolution from the updated rate (step S504). For example, when a storage area of "5 G" is allocated and the updated rate is "10 GB/h", the capacity determining unit adds a virtual volume of "5 G to 10 G".

The determining unit selects a storing medium from the load distribution table (step S505). More specifically, when a plurality of storing media is present, the determining unit determines a storing medium for which the calculating unit has calculated the lowest usage rate.

The adding unit registers the added volume into the load distribution table (step S506), and allocates the virtual volume (step S507). More specifically, when the monitoring unit has obtained the monitoring result indicating that the unused capacity has become equal to or smaller than the threshold value, the adding unit newly adds a storage area from the storage area determined by the calculating unit according to the capacity determined by the capacity determining unit.

Referring to FIG. 25, description will be given for a storing process by the backing-up apparatus 20 according to the second embodiment.

In the backing-up apparatus 20 according to the second embodiment, when an updating request has been issued and it has been confirmed that the data is stored (Yes at steps S601 and S603), the storing unit 333 checks whether the copying destination capacity is insufficient (step S604). In this case, when the storing unit 333 has confirmed that the capacity is not insufficient (No at step S604), the storing unit 333 stores the data in the confirmed storage area (steps S607 to S612).

On the other hand, when the storing unit 333 has confirmed that the capacity is insufficient (Yes at step S604), the storing unit 333 checks the allocation state of the virtual volume (step S605) and obtains the capacity of the virtual volume (step S606). For example, the storing unit 333 checks the virtual volume correlated with the generation for which the data is stored, from the SDV management table 323 and the storing unit 333 secures the capacity to store the data. The storing unit 333 stores the data (steps S607 to S612).

Steps S601 to S603 in FIG. 25 correspond to steps S201 to S203 in FIG. 16 and steps S607 to S612 correspond to steps S204 to S209 and, therefore, description therefor is omitted.

As above, in the backing-up apparatus 20, the monitoring unit monitors each storage area allocated by the allocating unit 331 about the unused capacity of the storage area and. When the monitoring unit has obtained the monitoring result indicating that the unused capacity becomes equal to or smaller than the predetermined threshold value, the adding unit newly adds a storage area correlating this area with the identification information correlated with the storage area for which the monitoring result has been obtained. Therefore, the backing-up apparatus 20 can prevent a capacity overflow.

For example, in the conventional approach, the logic capacity of the copying destination volume is set being equal to or larger than that of the copying origin volume. However, the actual physical capacity is set being small compared to that of the copying origin volume. Therefore, when the updated amount of the copying origin volume is larger than its estimated amount, a capacity overflow occurs in the storage area allocated to store the snapshot.

Compared to such a conventional approach, when a capacity overflow is about to occur, the backing-up apparatus 20 adds in advance a storage area and, thereby, can prevent the capacity overflow even when the updated amount of the copying origin volume has exceeded its estimated amount.

As above, the backing-up apparatus 20 can realize efficient generation backing up by combining advantages respectively of both the reduction of backup data in the generation backing up (described in the first embodiment) and the optimization of the capacity of the copying destination volume using the virtual volume.

When the adding unit adds a storage area correlating this area with identification information, the backing-up apparatus 20 determines the capacity of the storage area to be added based on the time interval between a time point identified by the identification information and a time point that is closest to the identified time point, and the capacity of data stored in the storage area against an elapsed time elapsed since the data has been stored in the storage area correlated with the identification information. Then, the backing-up apparatus 20 newly adds a storage area according to the capacity determined by the capacity determining unit. Therefore, the backing-up apparatus 20 can add a storage capacity having a proper capacity.

For example, the backing-up apparatus 20 can variably determine the storage capacity taking into account the interval of generation backing up and the updated amount.

The backing-up apparatus 20 includes a storing apparatus configured by a plurality of storing media having the predetermined upper limit capacity and each storing medium is uniquely identified. Therefore, when the monitoring unit has obtained the monitoring result indicating that the unused capacity has become equal to or smaller than the predetermined threshold value, the backing-up apparatus 20 newly adds a storage area from the storing media, calculates for each storing medium the usage rate that represents the rate that the used amount of each storing medium stored in the load distribution table accounts for in the predetermined upper limit capacity of the storing medium, and determines a storage area to be added from the storing medium that shows the lowest usage rate of the calculated usage rates. Therefore, the backing-up apparatus 20 can prevent the performance of a specific storing medium from being degraded.

For example, when the additional storage capacity is allocated using particularly a specific storing medium, the usage rate of only the allocated storing medium is increased and, therefore, the performance of the storing medium may be degraded.

In contrast, the backing-up apparatus 20 can manage the storing media being used and the used amount as a control table for each specific unit of the storing media (for example, for each magnetic disc, or for a plurality of magnetic discs as a unit, etc.), can calculate the used amount for each storing medium, and can allocate a storage capacity from the storing medium that shows the lowest used amount. Therefore, the backing-up apparatus 20 can prevent the performance degradation of the specific storing medium.

Though the embodiments of the present invention have been described, the present invention may be practiced in various different forms other than the above embodiments.

In combinations of an approach (1) of storing the original data in only the latest generation, an approach (2) of reading from the latest generation when a read request is received and the data is not present in the generation identified by the identification information, an approach (3) of reading from the closest generation when the data that stores the data correlated with the position information indicating the place to be read is present in a plurality of generations, an approach (4) of changing a snapshot, an approach (5) of executing the pre-change storing process when a snapshot is changed, an approach (6) of adding a virtual volume, an approach (7) of determining a capacity to be added from the updated rate, etc., when a virtual volume is added, and an approach (8) of distributing the load on a storing medium, the approaches (1) to (5) are practiced in the first embodiment and the description has been given for practicing the approaches (6) to (8) in the second embodiment. However, the present invention is not limited to the above and, in addition to the approach (1), one or more approaches may be combined and practices. In this case, the approaches (7) and (8) respectively are on the premise that the approach (6) is practiced.

Figure 26:
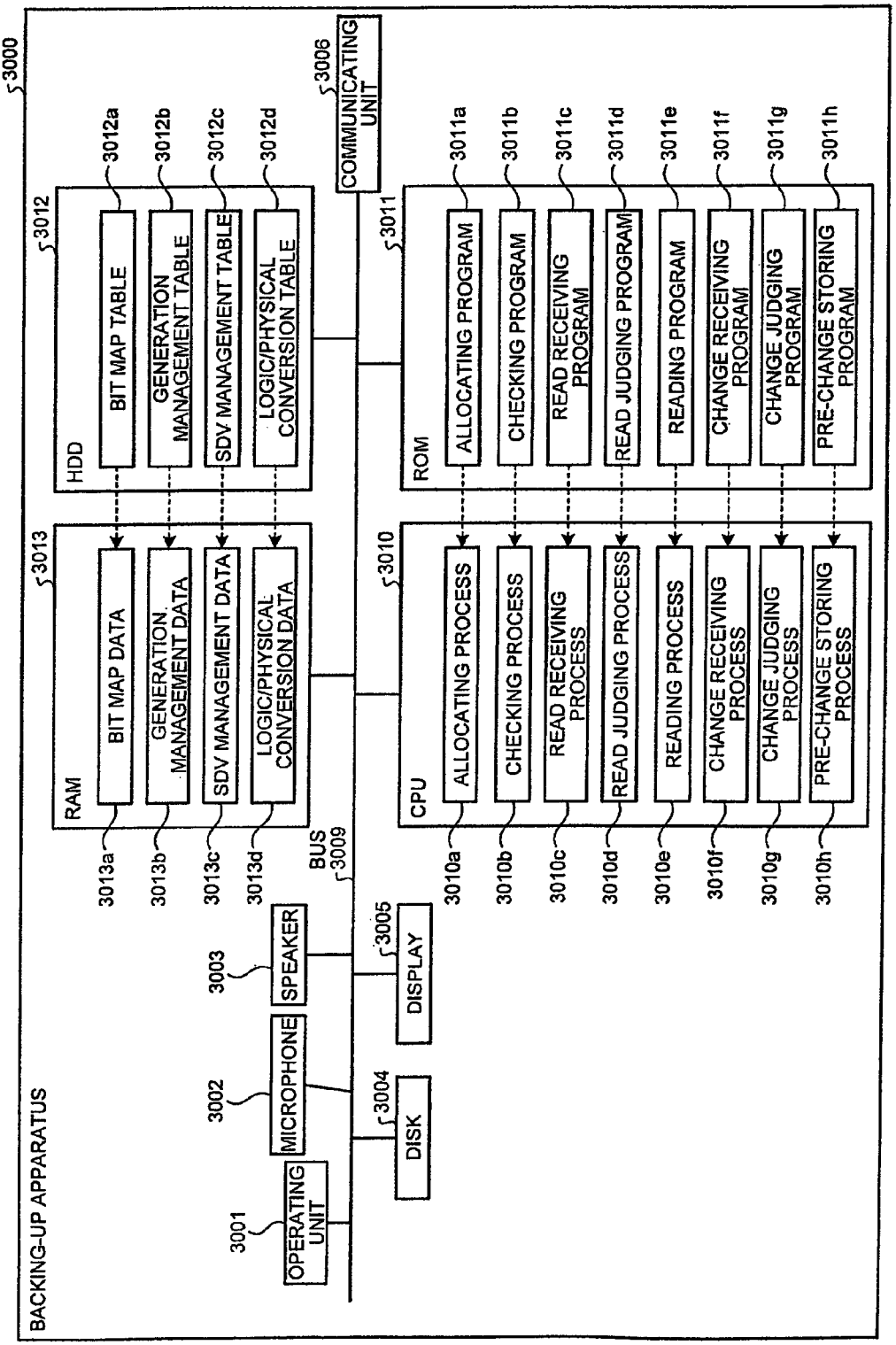
FIG. 26 is an explanatory view of programs of the backing-up apparatus according to the first embodiment.
Figure 27:
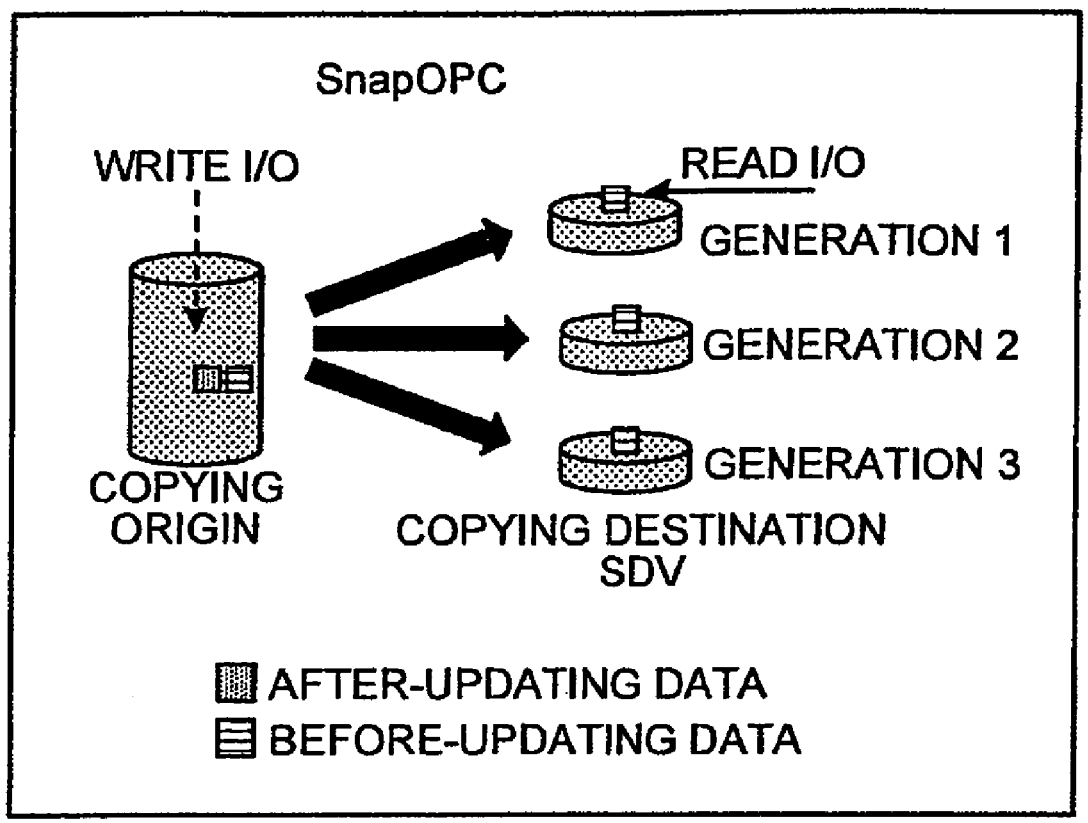
FIG. 27 is an explanatory view of conventional SnapOPC.

In the above first embodiment, the description has been given for the case where various processes are realized using hardware logics. However, the present invention is not limited to the above embodiments and the present invention may be practiced by executing a program prepared in advance on a computer. Referring to FIG. 26, description will be given below for an example of a computer that executes a backing-up program having the same functions as those of the backing up shown in the above first embodiment. FIG. 26 is an explanatory view of a program executed by a backing-up apparatus according to the first embodiment.

As shown in FIG. 26, a backing-up apparatus 3000 in the first embodiment is configured by an operating unit 3001, a microphone 3002, a speaker 3003, a Disc 3004, a display 3005, a communicating unit 3006, a CPU 3010, a ROM 3011, an HDD 3012, and a RAM 3013 that are connected by a bus 3009, etc.

The ROM 3011 has stored therein in advance a control program that exerts the same functions as those of the allocating unit 331, the checking unit 332, the read receiving unit 334, the read judging unit 335, the reading unit 336, the change receiving unit 337, the change judging unit 338, and the pre-change storing unit 339 that are shown in the above first embodiment, that is, as shown in FIG. 26, an allocating program 3011a, a checking program 3011b, a read receiving program 3011c, a read judging program 3011d, a reading program 3011e, a change receiving program 3011f, a change judging program 3011g, and a pre-change storing program 3011h are stored in advance. These programs 3011a to 3011h may be consolidated or separated similarly to the components for backing up shown in FIG. 4.

The CPU 3010 reads the programs 3011a to 3011h from the ROM 3011 and executes these programs and, thereby, as shown in FIG. 26, the programs 3011a to 3011h function respectively as an allocating process 3010a, a checking process 3010b, a read receiving process 3010c, a read judging process 3010d, a reading process 3010e, a change receiving process 3010f, a change judging process 3010g, and a pre-change storing process 3010h. The processes 3010a to 3010h correspond respectively to the allocating unit 331, the checking unit 332, the read receiving unit 334, the read judging unit 335, the reading unit 336, the change receiving unit 337, the change judging unit 338, and the pre-change storing unit 339 shown in FIG. 4.

The HDD 3012 is provided with a bit map table 3012a, a generation management table 3012b, an SDV management table 3012c, and a logic/physical conversion data table 3012d. The tables 3012a to 3010d correspond respectively to the bit map table 321, the generation management table 322, the SDV management table 323, and the logic/physical conversion data table shown in FIG. 4.

The CPU 3010 reads the bit map table 3012a, the generation management table 3012b, the SDV management table 3012c, and the logic/physical conversion data table 3012d, stores these tables in the RAM 3013, and executes the backing-up program using bit map data 3013a, generation management data 3013b, SDV management data 3013c, and logic/physical conversion data 3013d stored in the RAM 3013.

The backing-up apparatus described in the embodiments can be realized by executing a program prepared in advance on a computer such as a personal computer, a work station, etc. This program may be distributed via networks and recorded in a computer-readable recording medium such as a hard disc, a flexible disc (FD), a CD-ROM, an MO, a DVD, etc., and may be executed by being read from the recording medium by the computer.

When the backing-up apparatus produces a snapshot, the apparatus can reduce the amount to be transferred of the data stored from the original data to the storage area.

The backing-up apparatus can securely read the data that constitutes each snapshot in the approach of storing the original data immediately before the updating that corresponds to the place to which the updating has been executed into only the storage area that stores the newest snapshot.

The backing-up apparatus can execute processing using the proper snapshot even when snapshots have been produced respectively at a plurality of time points.

The backing-up apparatus can update the designated snapshot without giving any influence to snapshots other than the snapshot to be updated.

The backing-up apparatus can execute processing using the proper snapshot even when snapshots have been produced respectively at a plurality of time points.

The backing-up apparatus can prevent a capacity overflow.

The backing-up apparatus can add a storage capacity having a proper capacity.

The backing-up apparatus can prevent performance degradation of a specific storage medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A backing-up apparatus that produces, for each time point at which backing up is executed, a snapshot representing original data at the time point at which the backing up is executed for the original data to be backed up, the apparatus comprising:

an allocating unit that, upon receiving an instruction to execute the backing up, allocates, with respect to each time point designated by the instruction, a storage area to store a snapshot produced at a time point designated by the instruction;

a checking unit that, on the occasion that original data is updated after the time point designated by the instruction, checks whether the original data corresponding to a place for which the updating has been executed at a time point immediately before the time point designated by the instruction is stored in the storage area allocated by the allocating unit as a storage area to store the latest snapshot produced for the immediately previous time point; and a storing unit that, on the occasion that the checking unit confirms that the original data is not stored, stores the original data immediately before the updating in only the storage area for the latest snapshot, the original data immediately before the updating corresponding to the place for which the updating has been executed.

2. The backing-up apparatus of claim 1, wherein the allocating unit allocates, correlating with identification information that identifies a time point indicated by the instruction, the storage area to store the snapshot produced for the time point, and wherein the storing unit stores position information indicating the place for which the updating has been executed and the original data immediately before the updating in the place indicated by the position information, in the storage area correlated with the identification information that identifies the time point immediately before the time point indicated by the instruction, by correlating the position information and the original data with each other, the backing-up apparatus further comprising:

a read receiving unit that receives information indicating to read data from the snapshot, the identification information, and the position information;

a first read judging unit that judges whether the original data that is correlated with the received position information is stored in the storage area correlated with the identification information received by the read receiving unit;

a second read judging unit that, on the occasion that the first read judging unit judges that the original data is not stored, judges whether the original data that is correlated with the received position information is stored in the storage area correlated with the identification information indicating a time point after a time period has elapsed compared to the time point identified by the identification information received by the read receiving unit; and a reading unit that reads the original data correlated with the received position information from the storage area for which the first read judging unit judges that the original data is stored on the occasion that the first read judging unit judges that the original data is stored, reads the original data correlated with the received position information from the storage area for which the second read judging unit judges that the original data is stored on the occasion that the second read judging unit judges that the original data is stored, and reads data in the place indicated by the received position information from the original data at the present time point on the occasion that the second read judging unit judges that the original data is not stored.

3. The backing-up apparatus of claim 2, wherein on the occasion that the second read judging unit judges that a plurality of storage areas are present, the reading unit reads the original data correlated with the received position information from the storage area correlated with the identification information that identifies a time point that is closest to the time point identified by the identification information received by the read receiving unit.

4. The backing-up apparatus of claim 1, further comprising:

a change receiving unit that receives information indicating to execute a change to the snapshot, identification information indicating the storage area that stores therein the snapshot to which the change is executed, and position information indicating a place to which the change is executed;

a first change judging unit that judges whether the original data that is correlated with the received position information is stored in the storage area correlated with the identification information received by the change receiving unit;

a second change judging unit that judges whether the original data that is correlated with the received position information is stored in the storage area correlated with the identification information that indicates a time point previous to the time point identified by the identification information received by the change receiving unit;

a third change judging unit that judges whether the original data that is correlated with the received position information is stored in the storage area correlated with the identification information that indicates a time point after a time period has elapsed compared to the time point identified by the identification information received by the change receiving unit;

a first pre-change storing unit that, upon the second change judging unit judging that the original data is not stored, on the occasion that the first change judging unit judges that the original data is stored, reads the original data correlated with the received position information from the storage area correlated with the received identification information, on the occasion that the first change judging unit judges that the original data is not stored and the third change judging unit judges that the original data is stored, reads the original data correlated with the received position information from the storage area for which the third change judging unit judges that the original data is stored, and, on the occasion that the first change judging unit judges that the original data is not stored and the third change judging unit judges that the original data is not stored, reads data in the place indicated by the received position information from the original data at the present time point and stores the read data correlating the read data with the position information in the storage area for which the second change judging unit judges that the original data is not stored, before the change is executed to the place indicated by the received position information; and a second pre-change storing unit that, upon the first change judging unit judging that the original data is not stored, on the occasion that the third change judging unit judges that the original data is stored, reads the original data correlated with the received position information from the storage area for which the third change judging unit judges that the original data is stored, and on the occasion that the third change judging unit judges that the original data is not stored, reads data in the place indicated by the received position information from the original data at the present time point and stores the read data correlating the read data with the position information in the storage area correlated with the received identification information, before the change is executed to the place indicated by the received position information.

5. The backing-up apparatus of claim 4, wherein on the occasion that plural pieces of the identification information are present that each indicate a time point previous to the time point identified by the identification information received by the change receiving unit and on the occasion that it has been judged that the original data is not stored in the storage area correlated with immediately-previous identification information that is the identification information identifying a time point that is closest to the time point identified by the received identification information, the first pre-change storing unit stores the data in the storage area correlated with the immediately-previous identification information before the change is executed to the place indicated by the received position information, and wherein on the occasion that a plurality of storage areas are present that the third change judging unit judges that the original data is stored therein, the second pre-change storing unit reads the original data correlated with the received position information from the storage area correlated with the immediately-previous identification information of the plurality of storage areas.

6. The backing-up apparatus of claim 1, further comprising:

a monitoring unit that monitors an unused capacity for each storage area allocated by the allocating unit; and an adding unit that, on the occasion that the monitoring unit has obtained the monitoring result indicating that the unused capacity has become equal to or smaller than a predetermined threshold value, newly adds a storage area correlating this area with the identification information correlated with the storage area for which the result has been obtained.

7. The backing-up apparatus of claim 6, further comprising a capacity determining unit that, on the occasion that the storage area is added by the adding unit correlated with the identification information, determines the capacity of the storage area to be added from the capacity of data stored in the storage area in accordance with one of the time interval between a time point identified by the identification information and a time point that is closest to the identified time point, and an elapsed time period elapsed since the data has been stored in the storage area correlated with the identification information, wherein the adding unit newly adds a storage area according to the capacity determined by the capacity determining unit.

8. The backing-up apparatus of claim 6, further comprising a storing apparatus configured by a plurality of storing media having a predetermined upper limit capacity, wherein each storing medium is uniquely identified, wherein the adding unit newly adds a storage area from the storing medium on the occasion that the monitoring unit has obtained the monitoring result indicating that the unused capacity has become equal to or smaller than a predetermined threshold value, the backing-up apparatus further comprising:

a management unit that manages a capacity table that stores therein a used amount that represents the total of capacities of the storage areas added by the adding unit;

a calculating unit calculates, for each storage medium, a used rate that represents a rate that a used capacity accounts for in the predetermined upper limit capacity of each storing medium for each storing medium stored in the capacity table managed by the managing unit; and a determining unit that determines the storage area to be added by the adding unit from the storing medium that has shown the lowest usage rate of the usage rates calculated by the calculating unit.

9. A backing-up method that produces, for each time point at which backing up is executed, a snapshot representing original data at a time point at which the backing up is executed for the original data to be backed up, the method comprising:

allocating, with respect to each time point designated by the instruction, upon receiving an instruction to execute the backing up, a storage area to store a snapshot produced at a time point designated by the instruction;

checking, on the occasion that original data is updated after the time point designated by the instruction, whether the original data corresponding to a place for which the updating has been executed at a time point immediately before the time point designated by the instruction is stored in the storage area allocated as a storage area to store the latest snapshot produced for the immediately previous time point; and storing, upon confirming that the original data is not stored, the original data immediately before the updating in only the storage area for the latest snapshot, the original data immediately before the updating corresponding to the place for which the updating has been executed.

10. A computer program product that produces, for each time point at which backing up is executed, a snapshot representing original data at the time point at which the backing up is executed for the original data to be backed up, the computer program product being embodied in a computer readable storage medium and comprising computer instructions for:

allocating, with respect to each time point designated by the instruction, upon receiving an instruction to execute the backing up, a storage area to store a snapshot produced at a time point designated by the instruction;

checking, on the occasion that original data is updated after the time point designated by the instruction, whether the original data corresponding to a place for which the updating has been executed at a time point immediately before the time point designated by the instruction is stored in the storage area allocated as a storage area to store the latest snapshot produced for the immediately previous time point; and storing, upon confirming that the original data is not stored, the original data immediately before the updating in only the storage area for the latest snapshot, the original data immediately before the updating corresponding to the place for which the updating has been executed.

* * * * *